(12) United States Patent
Ness et al.

(10) Patent No.: US 8,117,764 B2
(45) Date of Patent: Feb. 21, 2012

(54) CONTROL SYSTEM FOR PARTICULATE MATERIAL DRYING APPARATUS AND PROCESS

(75) Inventors: Mark A Ness, Underwood, ND (US); Matthew P Coughlin, Hibbing, MN (US); John M Wheeldon, Birmingham, AL (US); Adam M Johnson, Bismarck, ND (US)

(73) Assignee: Great River Energy, Maple Grove, MN (US)

( * ) Notice: Subject to any disclaimer, the term of this patent is extended or adjusted under 35 U.S.C. 154(b) by 0 days.

(21) Appl. No.: 13/068,539

(22) Filed: May 13, 2011

(65) Prior Publication Data
US 2011/0214309 A1 Sep. 8, 2011

Related U.S. Application Data

(60) Division of application No. 11/199,744, filed on Aug. 8, 2005, now Pat. No. 7,987,613, which is a continuation-in-part of application No. 11/107,152, filed on Apr. 15, 2005.

(60) Provisional application No. 60/618,379, filed on Oct. 12, 2004.

(51) Int. Cl.
*F26B 7/00* (2006.01)

(52) U.S. Cl. ............... 34/381; 34/413; 34/497; 110/346; 166/248

(58) Field of Classification Search .................... 34/369, 34/380, 381, 529, 413, 444, 497; 166/248, 166/302; 48/197 R; 110/346; 210/266, 210/247
See application file for complete search history.

(56) References Cited

U.S. PATENT DOCUMENTS

| | | | | |
|---|---|---|---|---|
| 4,597,188 A * | 7/1986 | Trappler | ............ | 34/287 |
| 5,749,160 A * | 5/1998 | Dexter et al. | ............ | 34/502 |
| 6,931,756 B2 * | 8/2005 | Morgan et al. | ............ | 34/202 |
| 7,404,262 B2 * | 7/2008 | Jurkovich et al. | ............ | 34/381 |
| 7,730,633 B2 * | 6/2010 | Jurkovich et al. | ............ | 34/381 |
| 7,987,613 B2 * | 8/2011 | Ness et al. | ............ | 34/138 |
| 2003/0097763 A1* | 5/2003 | Morgan et al. | ............ | 34/468 |
| 2004/0000069 A1* | 1/2004 | Gurol | ............ | 34/592 |
| 2005/0160620 A1* | 7/2005 | Morgan et al. | ............ | 34/469 |
| 2006/0112588 A1* | 6/2006 | Ness et al. | ............ | 34/513 |
| 2011/0214309 A1* | 9/2011 | Ness et al. | ............ | 34/526 |

* cited by examiner

*Primary Examiner* — Stephen M. Gravini
(74) *Attorney, Agent, or Firm* — Moss & Barnett

(57) ABSTRACT

A control system for controlling the utilization of heated waste streams for fluidizing particulate matter such as coal in a fluidizing bed dryer. The control system includes a number of graphic user interfaces that allow an operator to more easily monitor and/or control the various regulator devices. The control system controls coal handling or transportation, fluid handling or flow, and the discharge of discarded or separated coal from the dryer.

36 Claims, 10 Drawing Sheets

CONTROL SYSTEM FOR PARTICULATE MATERIAL DRYING APPARATUS AND PROCESS

CROSS-REFERENCE TO RELATED APPLICATION

This application is a divisional of U.S. Ser. No. 11/199,744 filed on Aug. 8, 2005, granted on Aug. 2, 2011 as U.S. Pat. No. 7,987,613, which is a continuation-in-part of U.S. Ser. No. 11/107,152 filed on Apr. 15, 2005, which claims the benefit of U.S. provisional application Ser. No. 60/618,379 filed on Oct. 12, 2004, which are hereby incorporated by reference.

FIELD OF THE INVENTION

This invention relates to a control system for controlling a dryer apparatus. More specifically, the invention utilizes a general programmable computer system in communication with at least one continuous throughput dryer, such as a fluidized bed dryer, of an industrial processing plant. Additionally, the system is in communication with other functions or operations of the industrial processing plant that are operatively coupled to the throughput dryer. While this system may be utilized in many varied industries in an efficient and economical manner, it is particularly well-suited for use in electric power generation plants for controlling the reduction of moisture content in coal before it is fired.

BACKGROUND OF THE INVENTION

Throughout the last century electric power plants have been servicing an increasing number of customers. To be able to successfully provide power to these customers, the electric power plants have had to grow. As the power plants grew they became more complex requiring new control systems to monitor their operations.

Older power plants typically utilize several remote operators to control its operations. For instance, auxiliary operators work in the plant operating and monitoring various valves, switches, and gauges of boilers, turbines and generators to produce the electric power. Once the electricity is generated, switchboard operators control the flow of the electricity out of the electric power plant. Power distributors and dispatchers control the flow of the electricity through transmission lines to industrial plants and substations that supply residential and commercial customers with electricity.

In modern electric power plants, the duties of the traditional auxiliary operators, switch operators and distributors and dispatchers are combined in a central control room. The control room operator(s) control an automated control system consisting of a central computer in communication with various peripheral devices that monitor and/or control different parts of the electric power plant.

The following is a general discussion of the operation of an electrical power plant to provide a better understanding of what is being controlled by the conventional automated control system. Large electric power plants producing electricity from any electric generator that is turned by a turbine shaft in response to some energy source. While some electric power plants are operated by hydroelectric or nuclear energy sources, about 63% of the world's electric power and 70% of the electric power produced in the United States is generated from the burning of fossil fuels like coal, oil, or natural gas. The burning of fossil fuels in power plants need to be monitored very closely. Close monitoring is very important when a power plant burns coal.

Mined coal is burned in a combustion chamber at the power plant to produce heat used to convert water in a boiler to steam. This steam is then superheated and introduced to huge steam turbines whereupon it pushes against fanlike blades of the turbine to rotate a shaft. This spinning shaft, in turn, rotates the rotor of an electric generator to produce electricity.

Once the steam has passed through the turbine, it enters a condenser where it passes around pipes carrying cooling water, which absorbs heat from the steam. As the steam cools, it condenses into water which can then be pumped back to the boiler to repeat the process of heating it into steam once again. In many power plants, the water in the condenser pipes that has absorbed the heat from the steam is pumped to a spray pond or cooling tower to be cooled. The cooled water can then be recycled through the condenser or discharged into lakes, rivers, or other water bodies. Conventional control systems can monitor the above steps in the production of electricity from fossil fuels. Eighty-nine percent of the coal mined in the United States is used as the heat source for electric power plants. Unlike petroleum and natural gas, the available supplies of coal that can be economically extracted from the earth are plentiful.

There are four primary types of coal: anthracite, bituminous, subbituminous, and lignite. While all four types of these coals principally contain carbon, hydrogen, nitrogen, oxygen, and sulfur, as well as moisture, the specific amounts of these solid elements and moisture contained in coal varies widely. For example, the highest ranking anthracite coals contain about 98% wt carbon, while the lowest ranking lignite coals (also called "brown coal") may only contain about 30% wt carbon. At the same time, the amount of moisture may be less than 1% in anthracite and bituminous coals, but 25-30% wt for subbituminous coals like Powder River Basin ("PRB"), and 35-40% wt for North American lignites. For Australia and Russia, these lignite moisture levels may be as high as 50% and 60%, respectively. These high-moisture subbituminous and lignite coals have lower heating values compared with bituminous and anthracite coals because they produce a smaller amount of heat when they are burned. Moreover, high fuel moisture affects all aspects of electric power unit operation including performance and emissions. High fuel moisture results in significantly lower boiler efficiencies and higher unit heat rates than is the case for higher-rank coals. The high moisture content can also lead to problems in areas such as fuel handling, fuel grinding, fan capacity, and high flue gas flow rates.

Bituminous coals therefore have been the most widely used rank of coal for electric power production because of their abundance and relatively high heating values. However, they also contain medium to high levels of sulfur. As a result of increasingly stringent environmental regulations like the Clean Air Act in the U.S., electric power plants have had to install costly scrubber devices upstream of the chimneys of these plants to prevent the sulfur dioxide ("$SO_2$"), nitrous oxides ("$NO_x$"), mercury compounds, and fly ash that result from burning these coals from polluting the air.

Lower-rank coals like subbituminous and lignite coals have gained increasing attention as heat sources for power plants because of their low sulfur content. Burning them as a fuel source can make it easier for power plants to comply with federal and state pollution standards. Also of great relevance is the fact that these subbituminous and lignite coals make up much of the available coal reserves in the western portion of the U.S. However, the higher moisture content of these lower-rank coal types reduces their heat values as a source of heat combustion. Moreover, such higher moisture levels can make such coals more expensive to transport relative to their heat values. They can also cause problems for industry because they break up and become dusty when they lose their moisture, thereby making it difficult to handle and transport them.

While natural gas and fuel oil have almost entirely replaced coal as a domestic heating fuel due to pollution concerns, the rising cost of oil and natural gas has led some factories and commercial buildings to return to coal as a heating source. Because of their higher heating values, bituminous and anthracite coals are generally preferred for these heating applications.

Coal is also the principal ingredient for the production of coke which is used in the manufacture of iron and steel. Bituminous coal is heated to about 2000° F. (1100° C.) in an air-tight oven wherein the lack of oxygen prevents the coal from burning. This high level of heat converts some of the solids into gases, while the remaining hard, foam-like mass of nearly pure carbon is coke. Most coke plants are part of steel mills where the coke is burned with iron ore and limestone to turn the iron ore into pig iron subsequently processed into steel.

Some of the gases produced during carbonization within the coke-making process turn into liquid ammonia and coal tar as they cool. Through further processing, these residual gases can be changed into light oil. Such ammonia, coal tar, and light oil can be used by manufactures to produce drugs, dyes, and fertilizers. The coal tar, itself, can be used for roofing and road surfacing applications.

Some of the gas produced during carbonization in the coke-making process does not become liquid. This "coal gas" burns like natural gas, and can provide heat for the coke making and steel-making processes. The alternative fuels industry has also developed processes for the gasification of coal directly without carbonization. High-energy gas and high-energy liquid fuel substitutes for gasoline and fuel oil result from such gasification processes. Thus, there are many valuable uses for coal besides its intrinsic heat value.

It has previously been recognized within the industry that heating coal reduces its moisture, and therefore enhances the rank and BTU production of the coal by drying the coal. Prior to its combustion in hot water boiler furnaces, drying of the coal can enhance the resulting efficiency of the boiler.

A wide variety of dryer devices have been used within the prior art to dry coal, such as rotary kilns, cascaded whirling bed dryers, elongated slot dryers, hopper dryers, traveling bed dryers, and vibrating fluidized bed dryers. The following dryer devices should give the reader an understanding of types of coal dryers developed thus far: U.S. Pat. No. 5,103,743 issued to Berg, U.S. Pat. No. 4,470,878 issued to Petrovic et al., U.S. Pat. No. 4,617,744 issued to Siddoway et al., U.S. Pat. No. 5,033,208 issued to Ohno et al, U.S. Pat. No. 4,606,793 issued to Petrovic et al., U.S. Pat. No. 4,444,129 issued to Ladt. While all of these different dryer devices may be used to remove moisture from particulate materials like coal, they are relatively complicated in structure, suffer from relative inefficiencies in heat transport, and in some cases are better suited for batch operations rather than continuous operations.

To remedy the above inefficiencies, fluidized-bed dryers or reactors have become well-known within the industry for drying coal. In such dryers, a fluidizing medium is introduced through holes in the bottom of the fluidized bed to separate and levitate the coal particles for improved drying performance. The fluidizing medium may double as a direct heating medium, or else a separate indirect heat source may be located within the fluidized bed reactor. The coal particles are introduced at one end of the reactor, and provide the propulsive means for transporting the particles along the length of the bed in their fluidized state. Thus, fluidized bed reactors are good for a continuous drying process, and provide a greater surface contact between each fluidized particle and the drying medium. See, e.g., U.S. Pat. Nos. 5,537,941 issued to Goldich; 5,546,875 issued to Selle et al.; 5,832,848 issued to Reynoldson et al.; 5,830,246, 5,830,247, and 5,858,035 issued to Dunlop; 5,637,336 issued to Kannenberg et al.; 5,471,955 issued to Dietz; 4,300,291 issued to Heard et al.; and 3,687,431 issued to Parks.

Many of these conventional drying processes, however, have employed very high temperatures and pressures. For example, the Bureau of Mines process is performed at 1500 psig, while the drying process disclosed in U.S. Pat. No. 4,052,168 issued to Koppelman requires pressures of 1000-3000 psi. Similarly, U.S. Pat. No. 2,671,968 issued to Criner teaches the use of updrafted air at 1000° F. Likewise, U.S. Pat. No. 5,145,489 issued to Dunlop discloses a process for simultaneously improving the fuel properties of coal and oil, wherein a reactor maintained at 850-1050° F. is employed. See also U.S. Pat. Nos. 3,434,932 issued to Mansfield (1400-1600° F.); and 4,571,174 issued to Shelton ($\leqq$1000° F.).

The use of such very high temperatures for drying or otherwise treating the coal requires enormous energy consumption and other capital and operating costs that can very quickly render the use of lower-ranked coals economically unfeasible. Moreover, higher temperatures for the drying process create another emission stream that needs to be managed. Further complicating this economic equation is the fact that prior art coal drying processes have often relied upon the combustion of fossil fuels like coal, oil, or natural gas to provide the very heat source for improving the heat value of the coal to be dried. See, e.g., U.S. Pat. Nos. 4,533,438 issued to Michael et al.; 4,145,489 issued to Dunlop; 4,324,544 issued to Blake; 4,192,650 issued to Seitzer; 4,444,129 issued to Ladt; and 5,103,743 issued to Berg. In some instances, this combusted fuel source may constitute coal fines separated and recycled within the coal drying process. See, e.g., U.S. Pat. Nos. 5,322,530 issued to Merriam et al; 4,280,418 issued to Erhard; and 4,240,877 issued to Stahlherm et al.

Efforts have therefore been made to develop processes for drying coal using lower temperature requirements. For example, U.S. Pat. No. 3,985,516 issued to Johnson teaches a drying process for low-rank coal using warm inert gas in a fluidized bed within the 400-500° F. range as a drying medium. U.S. Pat. No. 4,810,258 issued to Greene discloses the use of a superheated gaseous drying medium to heat the coal to 300-450° F., although its preferred temperature and pressure is 850° F. and 0.541 psi. See also U.S. Pat. Nos. 4,436,589 and 4,431,585 issued to Petrovic et al. (392° F.); 4,338,160 issued to Dellessard et al. (482-1202° F.); 4,495,710 issued to Ottoson (400-900° F.); 5,527,365 issued to Coleman et al. (302-572° F.); 5,547,549 issued to Fracas (500-600° F.); 5,858,035 issued to Dunlop; and 5,904,741 and 6,162,265 issued to Dunlop et al. (480-600° F.).

Several prior art coal drying processes have used still lower temperatures—albeit, only to dry the coal to a limited extent. For example, U.S. Pat. No. 5,830,247 issued to Dunlop discloses a process for preparing irreversibly dried coal using a first fluidized bed reactor with a fluidized bed density of 20-40 lbs/ft$^3$, wherein coal with a moisture content of 15-30% wt, an oxygen content of 10-20%, and a 0-2-inch particle size is subjected to 150-200° F. for 1-5 minutes to simultaneously comminute and dewater the coal. The coal is then fed to a second fluidized bed reactor in which it is coated with mineral oil and then subjected to a 480-600° F. temperature for 1-5 minutes to further comminute and dehydrate the product. Thus, it is apparent that not only is this process applied to coals having relatively lower moisture contents (i.e., 15-30%), but also the coal particles are only partially dewatered in the first fluidized bed reactor operated at 150-200° F., and the real drying takes place in the second fluidized bed reactor that is operated at the higher 480-600° F. bed temperature.

Likewise, U.S. Pat. No. 6,447,559 issued to Hunt teaches a process for treating coal in an inert atmosphere to increase its rank by heating it initially at 200-250° F. to remove its surface moisture, followed by sequentially progressive heating steps conducted at 400-750° F., 900-1100° F., 1300-1550° F., and 2000-2400° F. to eliminate the water within the pores of the coal particles to produce coal with a moisture content and volatiles content of less than 2% and 15%, respectively, by weight. Again, it is clear that the initial 200-250° F. heating step provides only a limited degree of drying to the coal particles.

One of the problems that can be encountered with the use of fluidized bed reactors to dry coal is the production of large quantities of fines entrapped in the fluidizing medium. Especially at higher bed operating conditions, these fines can spontaneously combust to cause explosions. Therefore, many prior art coal drying processes have resorted to the use of inert fluidizing gases within an air-free fluidized bed environment to prevent combustion. Examples of such inert gas include nitrogen, carbon dioxide, and steam. See, e.g., U.S. Pat. Nos. 3,090,131 issued to Waterman, Jr.; 4,431,485 issued to Petrovic et al.; 4,300,291 and 4,236,318 issued to Heard et al.; 4,292,742 issued to Ekberg; 4,176,011 issued to Knappstein; 5,087,269 issued to Cha et al.; 4,468,288 issued to Galow et al.; 5,327,717 issued to Hauk; 6,447,559 issued to Hunt; and 5,904,741 issued to Dunlop et al. U.S. Pat. No. 5,527,365 issued to Coleman et al. provides a process for drying low-quality carbonaceous fuels like coal in a "mildly reducing environment" achieved through the use of lower alkane inert gases like propane or methane. Still other prior art processes employ a number of heated fluidizing streams maintained at progressively decreasing temperatures as the coal travels through the length of the fluidized bed reactor to ensure adequate cooling of the coal in order to avoid explosions. See, e.g., U.S. Pat. Nos. 4,571,174 issued to Shelton; and 4,493,157 issued to Wicker.

Still another problem previously encountered by the industry when drying coal is its natural tendency to reabsorb water moisture in ambient air conditions over time after the drying process is completed. Therefore, efforts have been made to coat the surface of the dried coal particles with mineral oil or some other hydrocarbon product to form a barrier against adsorption of moisture within the pores of the coal particles. See, e.g., U.S. Pat. Nos. 5,830,246 and 5,858,035 issued to Dunlop; 3,985,516 issued to Johnson; and 4,705,533 and 4,800,015 issued to Simmons.

In order to enhance the process economics of drying low-rank coals, it is known to use waste heat streams as supplemental heat sources to the primary combustion fuel heat source. See U.S. Pat. No. 5,322,530 issued to Merriam et al. This is particularly true within coking coal production wherein the cooling gas heated by the hot coke may be recycled for purposes of heating the drying gas in a heat exchanger. See, e.g., U.S. Pat. Nos. 4,053,364 issued to Poersch; 4,308,102 issued to Wagener et al.; 4,338,160 issued to Dellessard et al.; 4,354,903 issued to Weber et al.; 3,800,427 issued to Kemmetmueller; 4,533,438 issued to Michael et al.; and 4,606,793 and 4,431,485 issued to Petrovic et al. Likewise, flue gases from fluidized bed combustion furnaces have been used as a supplemental heat source for a heat exchanger contained inside the fluidized bed reactor for drying the coal. See, e.g., U.S. Pat. Nos. 5,537,941 issued to Goldich; and 5,327,717 issued to Hauk. U.S. Pat. No. 5,103,743 issued to Berg discloses a method for drying solids like wet coal in a rotary kiln wherein the dried material is gasified to produce hot gases that are then used as the combustion heat source for radiant heaters used to dry the material within the kiln. In U.S. Pat. No. 4,284,476 issued to Wagener et al., stack gas from an associated metallurgical installation is passed through hot coke in a coke production process to cool it, thereby heating the stack gas which is then used to preheat the moist coal feed prior to its conversion into coke.

None of these prior art processes, however, appear to employ a waste heat stream in a coal drying operation as the sole source of heat used to dry the coal. Instead, they merely supplement the primary heat source which remains combustion of a fossil fuel like coal, oil, or natural gas. In part, this may be due to the relatively high drying temperatures used within these prior art dryers and associated processes. Thus, the process economics for drying the coal products, including low-rank coals, continues to be limited by the need to burn fossil fuels in order to dry a fossil fuel (i.e., coal) to improve its heat value for firing a boiler in a process plant (e.g., an electric power plant).

Moreover, many prior art fluidized bed dryers can suffer from plugging as the larger and denser coal particles settle to the bottom of the dryer, and make it more difficult to fluidize the rest of the particles. Condensation within the upper region of the dryer can also cause the fluidized particles to agglomerate and fall to the bottom of the dryer bed, thereby contributing to this plugging problem. For this reason, many of the prior art fluidized dryer designs seem to be vertical in orientation or feature multiple, cascading dryers with fluidizing medium inlet jets directed to creating improved fluidizing patterns for the coal particles contained within the dryer.

The operation of a dryer unit such as a fluidized bed dryer at lower temperatures below 300° F. would be desirable, and could obviate the need to suppress spontaneous combustions of the coal particles within the dryer. Moreover, incorporation of mechanical means within the fluidized bed dryer for physically separating and removing larger, denser coal particles from the dryer bed region and eliminating condensation around the fluidized particles would eliminate potential plugging problems that can otherwise cause dryer inefficiencies. Perhaps more importantly for the present invention, none of the prior fluidized bed dryers discuss, disclose, teach or suggest a control system that controls the heated waste streams entering and/or leaving the fluidized bed dryer.

Controlling the drying process of coal prior to its introduction to the boiler furnace should improve the process economics of using low-rank coals like subbituminous and lignite coal. Such low-rank coal sources could suddenly become viable fuel sources for power plants compared with the more traditionally used bituminous and anthracite coals. The economical use of lower-sulfur subbitumionous and lignite coals, in addition to removal of undesirable elements found within the coal that causes pollution, would also be greatly beneficial to the environment.

SUMMARY OF THE INVENTION

A control system for controlling the fluidization of particulate matter such as coal. The control system includes a number of graphic user interfaces that interact with programmable logic to monitor and/or control various devices and apparatuses that regulate the particulate drying process. The graphic user interfaces allow an operator to more easily monitor and/or control these various devices.

The control system controls three basic operations or processes. First, it controls the particulate or coal handling, which entails conveying raw (wet) coal from at least one bunker for at least temporarily storing the raw coal; a vibrating feeder that receives the raw coal from the bunker and feeds it into a crusher where it is crushed and eventually conveyed to the dryer for drying.

Secondly, the control system controls fluid handling or the introduction of warmed fluids into the dryer. Fluid handling includes entails regulating the temperature of fluids such as air and water by controlling the mixing and or blending, either physically or via conduction, hot or warmed air or water and cooled or cold air or water. In an example embodiment, the control system regulates the flow of heated water from the cooling towers and using it to heat a stream of air and/or allowing it to flow into the dryer to assist in drying the raw coal.

Lastly, the control system controls the discharge of discarded or separated coal from the dryer. The control system also controls the discharge and storage of dried coal from the dryer and into a storage bunker. During the fluidization process, fine coal particles can be forced into a dust collector where they accumulate and are eventually conveyed to a bunker for storage or further processing. In the event that some coal or other objects are rejected, either because of content of pollutants, size, or foreign object, control system can control the process that conveys it away from the dryer.

One object of the present invention is to allow an electric power plant or other processing plants to maximize the production and efficiency of their goods by utilizing heated waste streams as efficiently as possible. One way that this is achieved is by using an integrated control system that is self balancing, cost effect, and easy to use.

BRIEF DESCRIPTION OF THE DRAWINGS

The invention will be better understood and objects other than those set forth above will become apparent when consideration is given to the following detailed description thereof. Such description makes reference to the annexed drawing wherein.

DETAILED DESCRIPTION OF THE PREFERRED EMBODIMENT

Figure 1:
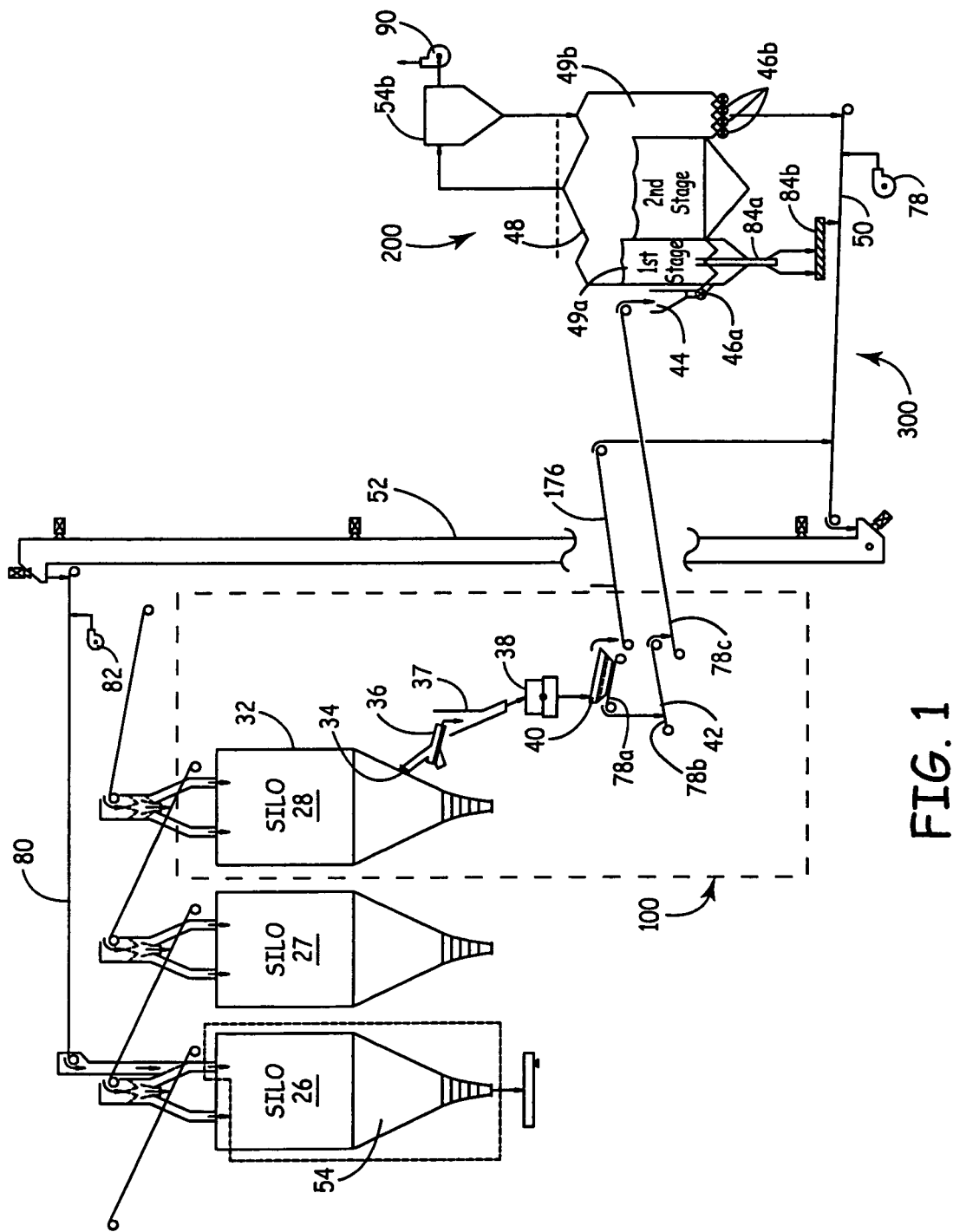
FIG. 1 is a schematic illustration of an electric power plant having raw coal handling, coal drying, and dry coal storage operations.

A control system for controlling the operation of a dryer apparatus for particulate materials within a low-temperature, open-air drying process without plugging in an industrial plant operation is provided by the invention. Such invention allows for the drying of the material on a continuous, higher-throughput, more economical basis, thereby enabling the use of lower-ranked (e.g., higher-moisture) material as a combustion on feedstock source that might not otherwise be viable within an industrial plant operation. Use and control of the dryer apparatus may also enable reduction in pollutants and other undesirable elements contained within the material before it is processed or combusted within the industrial plant operation.

Although the controller system of the present invention has application to many varied industries, such as food, chemical, and electronic industries, for illustrative purposes, the invention is described herein with respect to a typical coal-burning electric power generating plant, where removal of some of the moisture from the coal in a dryer is desirable for improving the heat value of the coal and the resulting boiler efficiency of the plant. Although particular embodiments of dryers will be discussed in describing example embodiments of the present invention, one skilled in the art will understand that the present invention can be used with other example embodiments of dryers for numerous items or goods.

Controlling the drying of coal in a fluidized bed with heated waste streams from the plant can enhance or even enable the use of low-rank coals like subbituminous and lignite coals. By reducing the moisture content of the coal, regardless of whether it constitutes low-rank or high-rank coal, other enhanced operating efficiencies may be realized, as well. For example, drier coal will reduce the burden on the coal handling system, including conveyers, and coal crushers in the electric generating plant. Since drier coal is easier to convey, this reduces maintenance costs and increases availability of the coal handling system. Drier coal is also easier to pulverize, so less "mill" power is needed to achieve the same grind size (coal fineness). With less fuel moisture, moisture content leaving the mill is reduced. This will improve the results of grinding the coal. Additionally, less primary air used to convey, fluidize, and heat the coal is needed. Such lower levels of primary air reduces air velocities and with lower primary air velocities, there is a significant reduction of erosion in coal mills, coal transfer pipes, coal burners, and associated equipment. This has the effect of reducing coal transfer pipe and mill maintenance costs, which are, for lignite-fired plants, very high. Reductions in stack emissions should also be realized, thereby improving collection efficiency of downstream environmental protection equipment.

The following definitions are provided to aid the reader in understanding the described example embodiment of the controller system. The definitions should therefore not be considered limiting but rather merely as an aid. Other definitions of the terms may likewise be applicable to the present invention.

For purposes of the present invention, "particulate material" means any granular or particle compound, substance, element, or ingredient that constitutes an integral input to an industrial plant operation, including but not limited to combustion fuels like coal, biomass, bark, peat, and forestry waste matter; bauxite and other ores; and substrates to be modified or transformed within the industrial plant operation like grains, cereals, malt, coffee, and cocoa.

In the context of the present invention, "industrial plant operation" means any combustion, consumption, transformation, modification, or improvement of a substance to provide a beneficial result or end product. Such operation can include but is not limited to electric power plants, coking operations, iron, steel, or aluminum manufacturing facilities, cement manufacturing operations, glass manufacturing plants, ethanol production plants, drying operations for grains and other agricultural materials, food processing facilities, and heating operations for factories and buildings. Industrial plant operations encompass other manufacturing operations incorporating heat treatment of a product or system, including but not limited to green houses, district heating, and regeneration processes for amines or other extractants used in carbon dioxide or organic acid sequestration.

As used in this application, "coal" means anthracite, bituminous, subbituminous, and lignite or "brown" coals, and peat. Powder River Basin coal is specifically included.

For purposes of the present invention, "quality characteristic" means a distinguishing attribute of the particulate material that impacts its combustion, consumption, transformation, modification, or improvement within the industrial plant operation, including but not limited to moisture content, carbon content, sulfur content, mercury content, fly ash content, and production of $SO_2$ and $NO_N$, carbon dioxide, and mercury oxide when burned.

As used in this application, "heat treatment apparatus" means any apparatus that is useful for the application of heat to a product, including but not limited to furnaces, dryers, cookers, ovens, incubators, growth chambers, and heaters.

In the context of the present invention, "dryer" means any apparatus that is useful for the reduction of the moisture content of a particulate material through the application of direct or indirect heat, including but not limited to a fluidized bed dryer, vibratory fluidized bed dryer, fixed bed dryer, traveling bed dryer, cascaded whirling bed dryer, elongated slot dryer, hopper dryer, or kiln. Such dryers may also consist of single or multiple vessels, single or multiple stages, be stacked or unstacked, and contain internal or external heat exchangers.

For purposes of this application "principal heat source" means a quantity of heat produced directly for the principal purpose of performing work in a piece of equipment, such as a boiler, turbine, oven, furnace, dryer, heat exchanger, reactor, or distillation column. Examples of such a principal heat source include but are not limited to combustion heat and process steam directly exiting a boiler.

As used in this application, "waste heat source" means any residual gaseous or liquid by-product stream having an elevated heat content resulting from work already performed by a principal heat source within a piece of equipment within an industrial plant operation that is used for the secondary purpose of performing work in a piece of equipment instead of being discarded. Examples of such waste heat sources include but are not limited to cooling water streams, hot condenser cooling water, hot flue or stack gas, spent process steam from, e.g., a turbine, or discarded heat from operating equipment like a compressor, reactor, or distillation column.

As mentioned above, coal fired in the boiler furnace of an electric power plant shall be used as exemplary particulate material and industrial plant operation for purposes of this application, but it is important to appreciate that any other material that constitutes a useful, necessary, or beneficial input to an industrial plant operation is covered by this application, as well.

The control system of the present invention can control and/or monitor various components of any type of dryer and any processes that are connected thereto. The control system will be discussed as being able to control the fluidized bed coal dryers described in the U.S. Ser. No. 11/107,152, filed on Apr. 15, 2005, which claims the benefit of U.S. provisional application Ser. No. 60/618,379 filed on Oct. 12, 2004; U.S. Ser. No. 11/107,153, filed on Apr. 15, 2005, which claims the benefit of U.S. provisional application Ser. No. 60/618,379 filed on Oct. 12, 2004; and U.S. patent application entitled "Apparatus For Heat Treatment Of Particulate Materials", filed on the same date as this application, which is a continuation-in-part of U.S. Ser. No. 11/107,152 filed on Apr. 15, 2005; U.S. Ser. No. 11/199,743 filed on Aug. 8, 2005, which is a continuation-in-part of U.S. Ser. No. 11/107,153 filed on Apr. 15, 2005; and U.S. provisional application Ser. No. 60/618,379 filed on Oct. 12, 1004, all of which are hereby incorporated by reference in their entirety.

A brief description of the process of drying coal at an electric power plant is provided to aid the reader in understanding the control system of the present invention.

Referring to the schematic illustration of an electric power plant of FIG. 1, after raw (wet) coal is brought to the electric power plant it is can be stored in a bunker 32 until it passes through a feed gate 34 and onto a vibrating feeder 36. The vibrating feeder 36 moves the raw coal through a chute 37 and into a crusher 38. The crusher 38 typically uses mechanical means to crush the raw coal to a generally predefined size. As the crushed coal falls from the crusher 38 it falls onto a sizing screen 40 that separates the coal and other material such as rocks and other debris by size. Raw coal of an acceptable predetermined size is permitted to fall through the sizing screen 40 and onto at least one feed conveyor 42 that feeds it into a hopper 44. At least one feed vane 46 is operatively disposed to or in the hopper 44 to feed the raw crushed coal into a dryer 48. In an example embodiment, the dryer 48 is a fluidized bed having a first stage 49a and a second stage 49b. The dryer 48 operates with low-temperatures, wherein the total moisture on the surface of and within the pores of the coal particles is reduced to a predetermined level to yield "dried" coal having an average moisture level of approximately 28-30% wt. The coal is fluidized in the first stage 49a and then flows over or through to the second stage 49b where additional heat is applied to complete the drying process. After the raw coal is dried it is disposed on a transport or dry coal conveyor 50 that conveys the dried coal to bucket elevator 52 that lifts the dried coal and deposits it into a dried coal storage bunker 54 where it is stored until it is fed into a boiler for burning and ultimately electricity generation. In an example embodiment, multiple dried coal storage bunkers can be arranged such that once one is filled the dried coal can be automatically deposited into a subsequent bunker. In one embodiment, as illustrated in FIG. 1, cascading conveyor belts can be disposed above the bunkers to convey an overflow of coal to a subsequent bunker.

Figure 2:
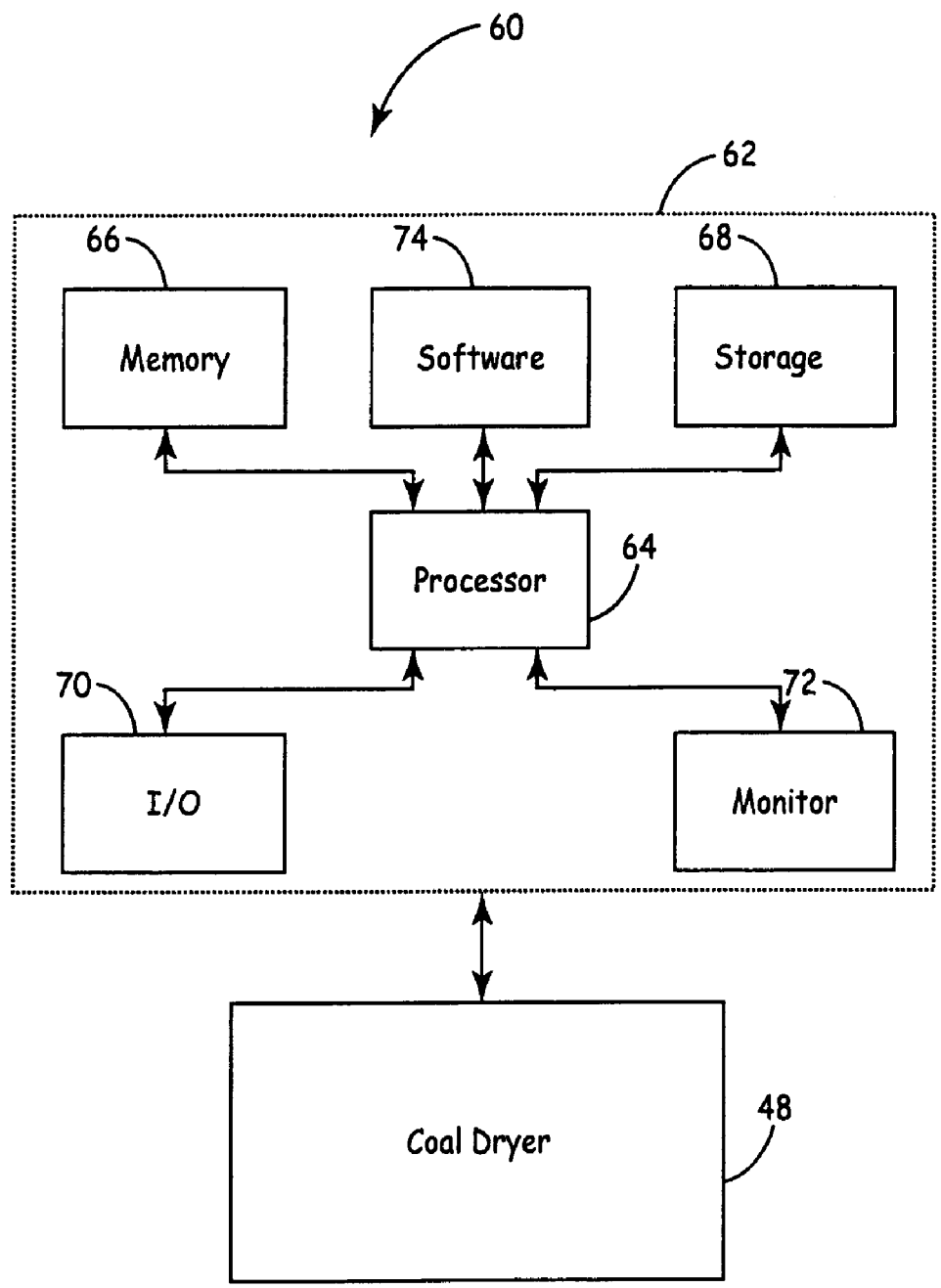
FIG. 2 is a flow diagram illustrating an example embodiment of a control system for controlling the drying of particulate material such as coal.

Referring to the example embodiment of FIG. 2, the control system 60 can comprise a general programmable computer 62 having a processor 64 controlling a memory unit 66, a storage unit 68, an input/output (I/O) control unit 70, and at least one monitor 72. One skilled in the art will recognize that other peripheral components such as printers, drives, keyboards, and the like can also be used in conjunction with programmable computer 62. Additionally, one skilled in the art will recognize that programmable computer 62 can utilize known hardware, software and the like configurations of varying computer components to optimize the monitoring and/or control of a dryer 48.

Continuing with FIG. 2, control system 60 can also include a software program 74 residing on the programmable computer 62 having a plurality of graphic user interfaces (GUIs) that permit the interaction, monitoring, and control between an operator and the dryer 48 and affiliated processes. Additionally, software program 74 includes a subsystem of feedback loops or networks to automatically monitor and/or control predetermined functions of the dryer 48.

Referring back to FIG. 1, and as briefly described above, control system 60 controls at least three basic operations of a particulate or coal drying process. In the example embodiment of drying raw coal, the control system 60 controls coal handling, indicated as numeral 100, which is the transportation of raw coal from the bunker 32 to the dryer 48. It also controls the drying process indicated as numeral 200. Lastly, control system 60 controls various operations of dried coal delivering and storage, indicated as numeral 300, which includes delivering dried coal from the dryer 60 to a bunker 54 where it is stored until it is either processed or is sent to a boiler or furnace for generating electricity.

The following discussion will focus on the control of each section, division, or operation of the plant by control system 60. It will follow the natural progression of the particulate or coal to be dried and the process, steps, or interactions of an operator with control system 10 to ensure the efficiency of the drying process. Control system 60 is ideally easily adaptable to controlling other processes and regulating devices that may not be described herein. One skilled in the art will recognize from the detailed description that control system 60 could be used to control sensors, transmitters, switches, gates, valves, and the like that would be used other non-described embodiments.

Graphic User Interface

Referring to FIGS. 3-6, software 74 includes at least one, but preferably multiple, graphic user interfaces (GUIs) to permit an operator to set, monitor and/or control various aspects of each of the stages of operation. In an example embodiment, the GUIs include Coal Drying Auto Select 400, Coal Drying Coal Conveying Overview 420, Unit Overview 481*a*, Coal Dryer Air Flow Overview 460, Coal Master Menu 480, Information 481*e*, Data Screen 481*f*, and Coal Drying Tagging 700. Other interactive screens can also be utilized with control system 60. Therefore, the example GUIs should not be considered limiting but rather as exemplary examples.

Figure 3:
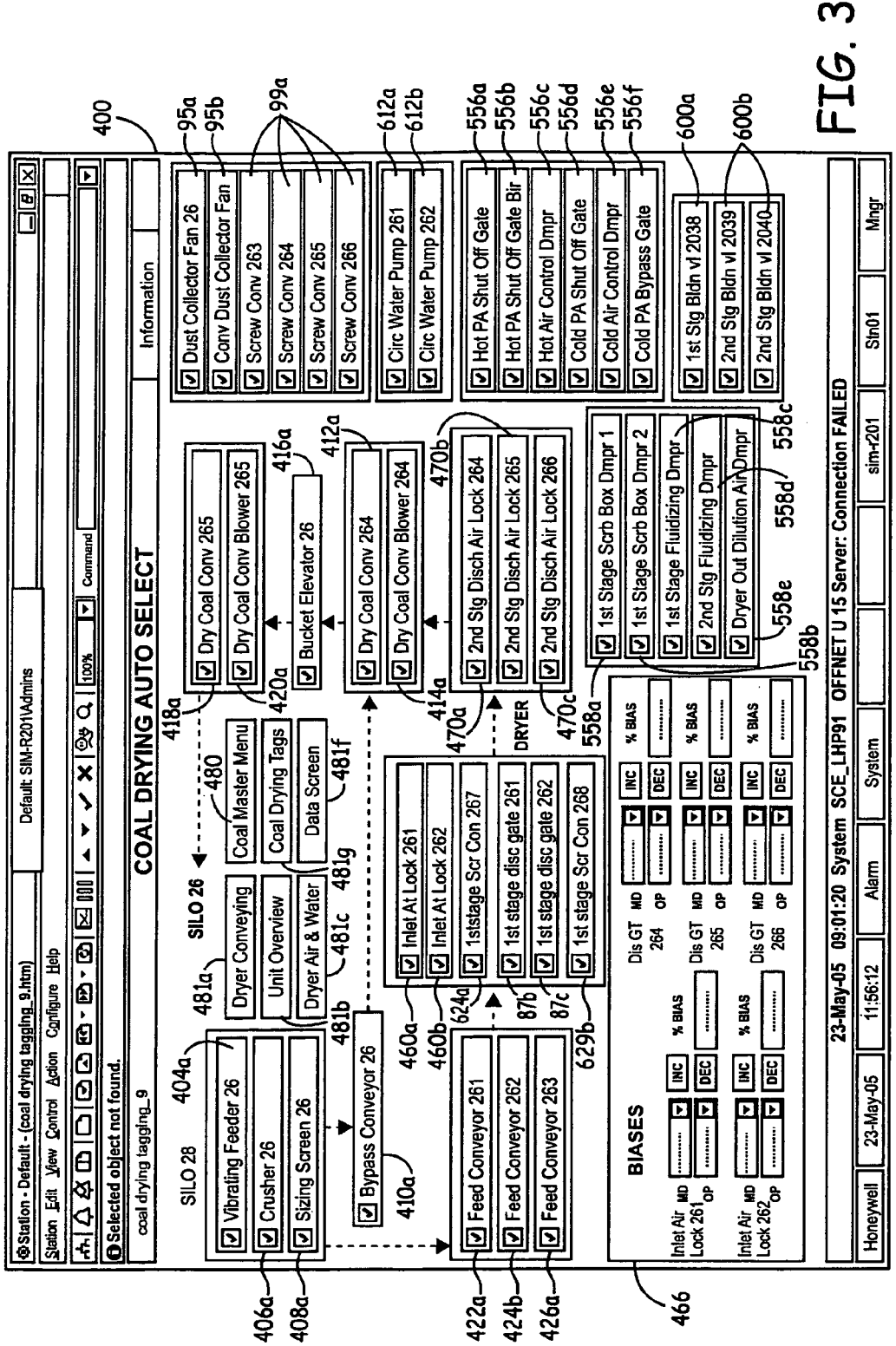
FIG. 3 is an interactive graphic user interface illustrating auto select capabilities for different apparatuses of the electric power plant.

Referring to the Coal Drying Auto Select GUI 400 of FIG. 3, an operator can pre-select particular plant operations to run under an automatic or manual state. On at least one of the GUIs an operator can set an Operating Mode of the entire coal drying process. In one example embodiment, an operator can either press, or select (via a dropdown menu) automatic control, manual control, pause or the like to select a predefined operational state of each of the devices or apparatuses under its control. For instance, in the automatic mode, each device that can operate automatically will be placed in an automatic state until such time as there is an operational change or the operator changes its state.

In the manual mode an operator can place a particular device under control of the control system 60 in an automatic state. In one example embodiment, as illustrated in FIG. 3, an operator can mark or check a box or similar marking indicator, to set that particular apparatus device in its automatic state. If an operator wants to remove a device from the auto mode, he or she can remove the mark from the check box. The state of the affected device will not immediately change. For example, if the device was running it will remain running unless its run permit is lost. If the device was off it will remain off until its run permit (permissive on state) is granted. The transition between auto mode and manual mode is seamless.

While a device is in the auto state, control system 60 automatically monitors and/or controls the operation of the device. Control system 60 also includes and monitors feedback loops from and/or between the devices. In one example embodiment, a change in the state of one of the devices can alter or change the state of other either manually or automatically controlled devices. Particular apparatus that can be selected for automatic operation will be discussed below in conjunction with the various operations and/or processes.

Figure 7:
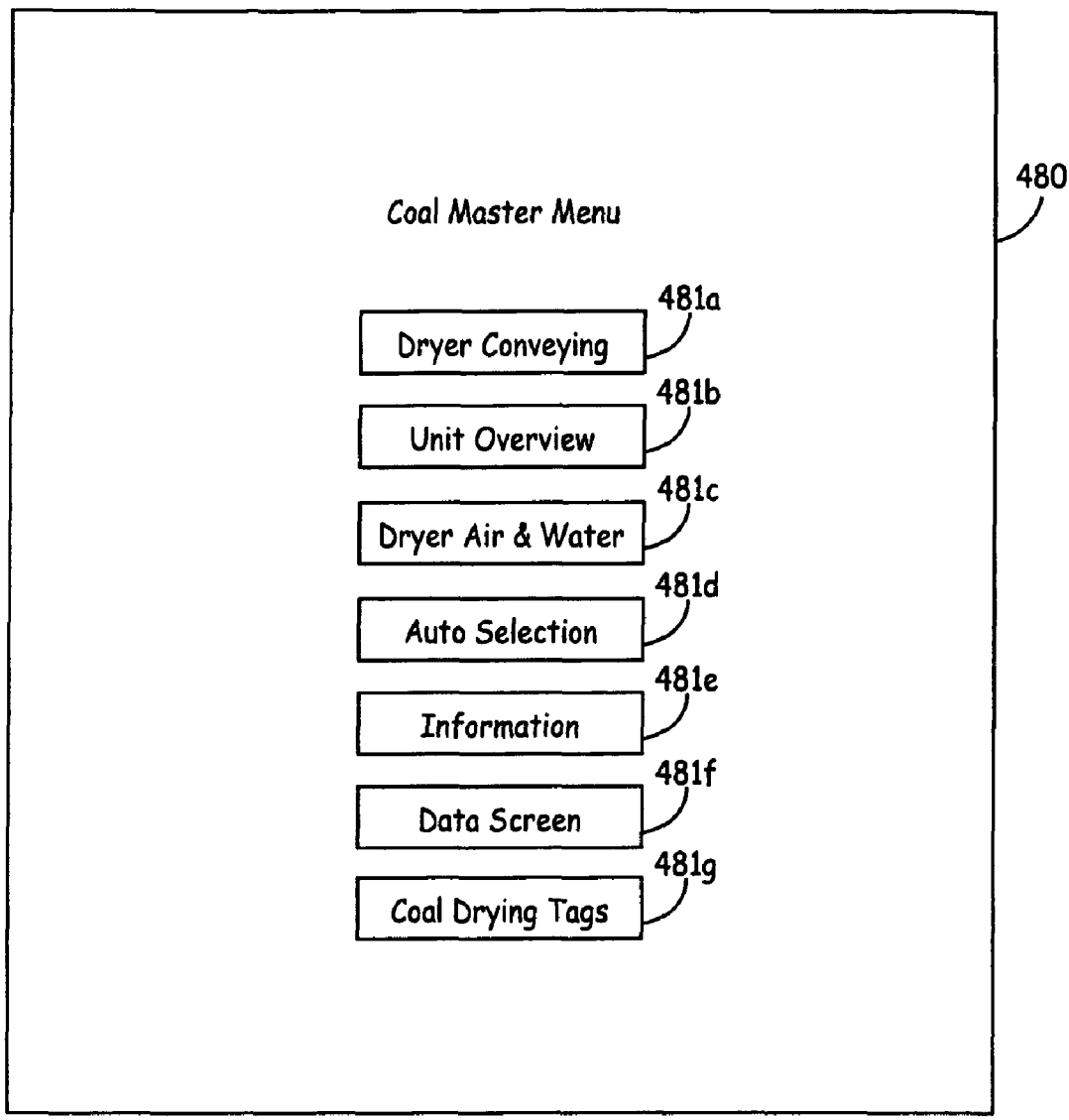
FIG. 7 is an interactive graphic user interface illustrating coal master menu having depressible icons to access other interactive graphic user interfaces.

Referring to FIG. 7, when an operator begins the process they may be initially shown the Coal Master Menu 480 which permits them to select between any of the available GUIs. As an example, the Coal Master Menu 480 can include a dryer conveying icon 481*a*, a unit overview icon 481*b*, a dryer air and water icon 481*c*, an auto selection icon 481*d*, an information icon 481*e*, and a data screen icon 481*f*. An operator can select any of the icons to go directly to the selected GUI. The Coal Master Menu 480 permits an operator to quickly move between GUIs which in turn permits them to quickly monitor and control various aspects of the plant operations. The remainder of the example GUIs will be discussed in conjunction with the control of the various processes. Each of the other GUIs includes icons 481*a*-481*f* to permit an operator to quickly move between each of the GUIs. Additional the present invention includes other GUIs that are associated with each aspect of the coal drying operation. These GUIs will be discussed in conjunction with their particular operation.

Control of Coal Handling

As illustrated in FIG. 1, raw (wet) coal is temporarily stored in a bunker 32 before entering the coal handling system. Referring to the Coal Drying Coal Conveying Overview GUI 420 of FIG. 4, the amount of raw coal in bunker 32 can be displayed by a weight indicator 401 disposed on a graphic illustration of bunker 32. Weight indicator 401 can display the weight of raw coal in tons or any other weight measurement. Control system 60 can monitor and/or control a level of the raw coal or particulate material in bunker 32. In one example embodiment, a level switch can be operatively disposed in bunker 32 to monitor a level of coal therein and report back to control system 60 if the level does not decrease over a predetermined period of time. If the level of coal does not decrease over the predetermined period of time, it can indicate to control system 60 that bunker 32 is plugged. Control system 60 can then automatically shut down or stop the coal feeding and/or drying process.

A feed gate 34 regulates the coal or particulate material entering onto a vibrating feeder 36 that controls the feed rate of the coal. Feed gate 34 is typically in an open or closed state. However, in one example embodiment, feed gate 34 also has a permissive-to-open state that permits to automatically open. The permissive-to-open state is actuated when vibrating feeder 36 is in the on-state and when the level switch indicates bunker 32 is full of coal. Feed gate 34 will automatically shut off if vibrating feeder 36 is off and/or level switch indicates a low level of coal in bunker 32. Feed gate 34 will also automatically close in the event there is an emergency shut off actuated by an operator.

Figure 4:
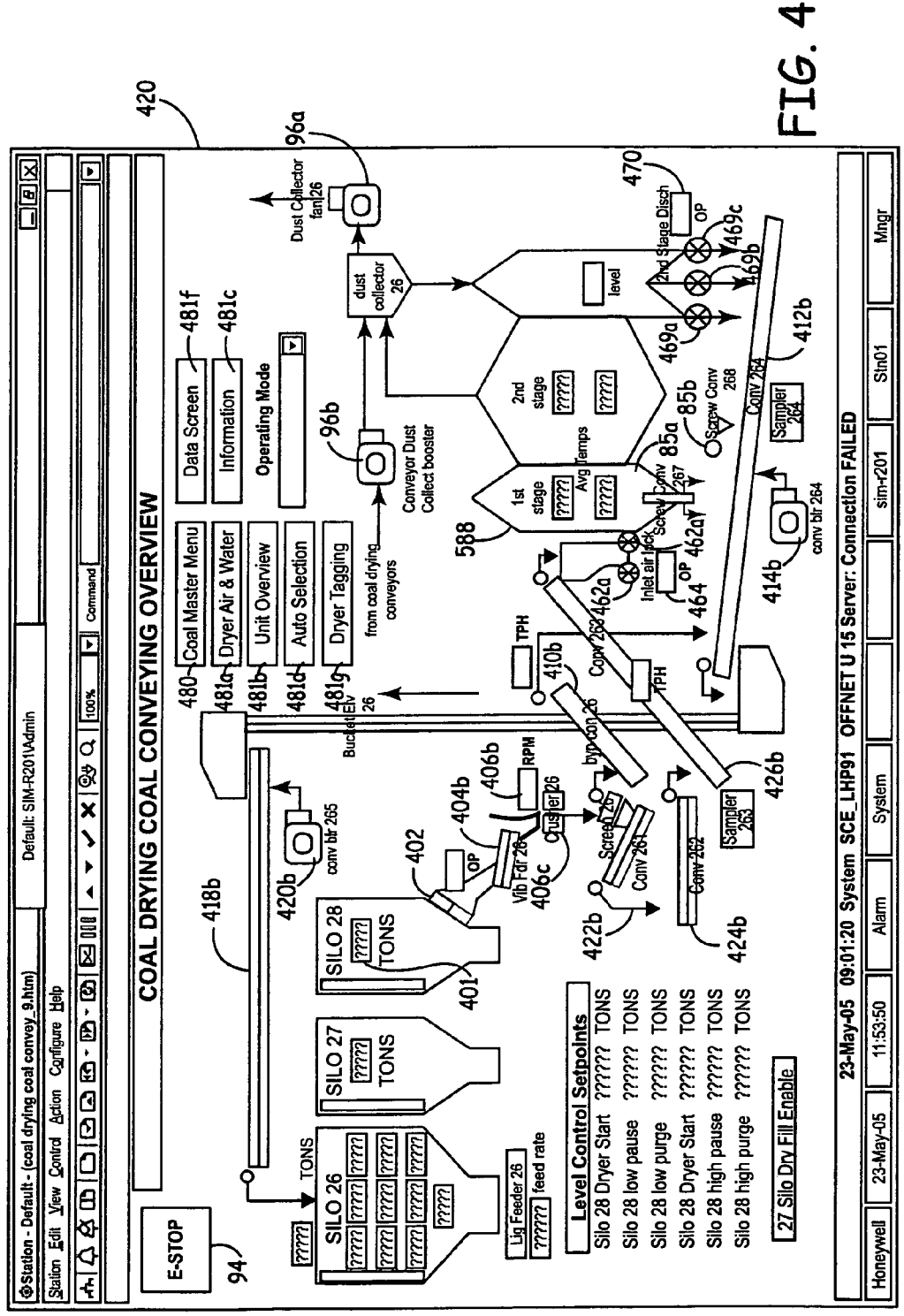
FIG. 4 is an interactive graphic user interface illustrating coal drying conveying overview for different apparatuses of the electric power plant.

Referring to the Coal Drying Coal Conveying Overview GUI 420 of FIG. 4, if feeder gate 34 is open, feeder gate indicator 402 will illuminate red. If feeder gate is closed it will illuminate green. In one example embodiment, as illustrated in FIG. 4, two feeder gate indicators 402 can be displayed. When both indicators are red it means the feeder gate 34 is open. When both indicators are green it means feeder gate 34 is closed. However, when feeder gate 34 is in mid-travel a left indicator is green and a right indicator is red. If both indicators are yellow feeder gate 34 is locked out and cannot be used. If both indicators are magenta feeder gate 34 is tagged out for repairs and the like.

Other colors and/or types of indicators such as numbers, symbols and the like can also be used to identify the operational status of feeder gate 34 or any other apparatus controlled by control system 60. An operator can select feeder gate icon 402 to call up a control box that allows the operator to place feeder gate 34 in an open state, closed state or lock out state.

Referring to the Coal Drying Auto Select GUI of FIG. 3, an operator can select to automatically control vibrating feeder 36 by placing a check or like indicator next to the vibrating feeder icon 404a. If the operator does not place a check next to vibrating feeder icon 404a, he or she will be able to operate vibrating feeder 36 manually. However, by selecting vibrating feeder icon 404a the vibrating feeder 36 receives a signal to modulate its vibration and thereby regulate the feed rate of the coal. When vibrating feeder 36 is on it feeds raw coal into chute 37 that deposits the coal into a crusher 38 that reduces the size of the coal through mechanical means to a predetermined size or other dimension such as weight, shape and the like.

Referring to Coal Drying Coal Conveying Overview GUI 420 of FIG. 4, if vibrating feeder 36 is operating under predefined conditions a vibrating feeder indicator 404b will be illuminated red. However, if the vibrating feeder 36 is not operating under predefined conditions it will be illuminated green. In one embodiment, there are two vibrating feeder indicator portions 404b. When both portions of vibrating feeder indicator 404b are red it indicates to an operator that vibrating feeder 36 is operating in auto mode. When one portion of vibrating indicator is red and one is green it indicates to an operator that vibrating feeder 36 is operating in manual mode. When both portions of vibrating feeder indicator 404b are green it indicates vibrating feeder 36 is off. The off indication is the same for automatic and manual modes. In one example embodiment, when both vibrating indicator portions 404b are illuminated yellow it means vibrating feeder 36 is locked out, while magenta indicates vibrating feeder 36 is tagged out, and white indicates vibrating feeder 36 is tripped. The vibrating feeder 36 will be tripped or shut down if a chute 37 feeding coal away from vibrating feeder 36 becomes plugged (detected by a level switch disposed therein) or if crusher 38 is turned off or shuts down.

When vibrating feeder 36 is in auto mode it cycles as predefined in software 74 logic. However, when vibrating feeder 36 is in manual mode it will run as long as permissive requirements are met. The permissive requirements for continued operation of vibrating feeder 36 are the running or operation of crusher 38 and chute 37 reporting back in a non-plugged state, or non-operational state.

In one embodiment, an operator can click on or otherwise select vibrating feeder indicator 404b to open another window that displays the current speed and/or spread of vibrating feeder 36. When vibrating feeder 36 is in the auto mode an operator can input a feeder flow rate based on a weigh scale further down the coal handling line. In the manual mode, an operator can manually enter or input vibrating feeder 36 speed.

Control system 60 is also in communication with a crushing mechanism of crusher 38. Referring to FIG. 3, an operator can check crusher icon 406a to set it for automatic operation or to leave it blank for manual operation. Under automatic operation the motor of the crushing mechanism will operate at a predefined speed measured in rotations-per-minute (rpm). As illustrated in FIG. 4, a crusher motor indicator 406b can display the rpms of the motor of the crushing mechanism. An operator may be able to manually alter the rpms at any time during the coal drying process.

Crusher 38 also has a permissive-to-start state that permits it to operate in the event sizing screen 40 is running and chute 37 is not plugged (as indicated by a level switch disposed therein). Referring to FIG. 4, at least one crusher indicator 406c will illuminate green if crusher 38 is operating and will illuminate red if it is not. In another embodiment, at least two crusher indicator portions 406c are displayed. In this embodiment, if both portions are red it indicates that crusher 38 is in auto mode, while two green indicator portions indicate that crusher 38 is stopped. When one indicator portion is red and the other is green it indicates that crusher 38 is in manual mode. Similar to other devices, when both portions are magenta crusher 38 is locked out and when both portions are white it indicates crusher 38 is tripped. Crusher will trip or shut down if chute 37 becomes plugged or screen 40 is turned off. In the auto mode crusher 38 will cycle according to the predefined logic of software 74.

In the manual mode crusher 38 will cycle while the permissive requirements are met. An operator can also select indicator 406b to open another window to set rpms of crusher 38 within the devices' limits.

Control system 60 is also in communication with a level switch operatively disposed or coupled to crusher 38 to monitor if crusher 38 becomes clogged. If crusher 38 becomes clogged a feedback loop of control system 60 can automatically stop vibrating feeder 36.

Referring to FIG. 3, an operator can select a sizing screen icon 408a to set sizing screen 40 in either auto mode or manual mode. Permissive operation of sizing screen 40 requires operation of a raw coal feed conveyor 78a below sizing screen 40 so that sizing screen 40 does not become clogged because coal is not being conveyed away. It also requires operation of a bypass conveyor 76 that receives and conveys away oversized particulate material to a bunker for further processing or disposal. Lastly, permissive operation of sizing screen 40 requires chute 37 to be in an un-plugged state to ensure that coal will flow or fall onto sizing screen 40.

Control system 60 can also be in communication with at least one level switch operatively disposed on sizing screen 40 to monitor if coal is flowing onto bypass conveyor 76 or feed conveyor 78a. Control system 60 can also be used to control the rate of oscillation of independent frames of sizing screen 40. By increasing or decreasing the rate of oscillation of the independent frames the rate of separation can also be controlled. In one embodiment, screen material of sizing screen 40 oscillates from a flat position toward an arched position to purge the oversized particulate material from the screen openings.

Referring to FIG. 3, an operator can select a bypass conveyor icon 410a to place the bypass conveyor 76 in either an auto mode or a manual mode. Permissive operation of bypass conveyor 76 requires operation of a dry coal conveyor 50, chute 37 in an un-plugged state, emergency pull cords in non-pulled states and a belt alignment switch un-triggered. A change of state of any one or more of the required permissive states will trip bypass conveyor 76, thereby stopping operations.

Turning now to FIG. 4, a bypass conveyor indicator 408b is illustrated to permit an operator to monitor and/or control bypass conveyor 76. An operator can select indicator 408b to open another window to start, stop and/or lock out bypass conveyor 76. Indicator 408b will illuminate red if bypass conveyor 76 is operating within predefined limits and/or there is no change in the states of the permissive requirements. If bypass conveyor 76 is not operating within predefined limits or there is a change of state of the permissive requirements, indictor 408b will be illuminated green. In one example embodiment, there are at least two bypass conveyor indicator portions 408b. When both indicator portions 408b are red it indicates bypass conveyor 76 is operating in auto mode. When one indicator portion is red and the other indicator portion is green it indicates bypass conveyor 76 is operating in manual mode. Again, when both indicator portions 408b are yellow the device is locked out, while two white indicator portions 408b indicate a tripped device. Two magenta indicator portions 408b indicate a tagged out device.

In one embodiment, a weigh scale is operatively disposed to bypass conveyor 76 to monitor the amount of particulate material being conveyed. The weigh scale can send a signal back to control system 60 to gather and calculate measurements, totals, and history. Control system 60 can then archive the material for later retrieval. A permissive start of weigh scale requires bypass conveyor 76 operating. If dryer 48 stops operating weigh scale will trip or automatically shut down.

In one embodiment, control system 60 monitors and/or controls the speed of bypass conveyor 76. Control system 60 is also in communication with a level switch that is in operative communication with bypass conveyor 76 to monitor if particulate material is conveyed from bypass conveyor 76 to dry coal conveyor 50.

As illustrated in FIG. 2, bypass conveyor 76 dumps or deposits the rejected particulate material onto dry coal conveyor 50. Referring to FIG. 3, an operator can select dry coal conveyor icon 412a to set either auto mode or manual mode for dry coal conveyor 50. Permissive operation of dry coal conveyor 50 requires operation of bucket elevator 52, an un-plugged state of chute 47, full air pressure under conveyor belt, un-triggered belt alignment switch and operation of a blower 78 in fluid communication with dry coal conveyor 50. If any of the permissive requirements are not met dry coal conveyor 50 will be tripped and automatically shut down.

Referring to FIG. 4, an operator can monitor and/or control dry coal conveyor 50 by a dry coal conveyor indicator 412b that illuminates red if dry coal conveyor 50 is operating and illuminates green if dry coal conveyor 50 is not operating. In one example embodiment, there are at least two indicator portions 412b. When both indicator portions 412b are red dry coal conveyor 50 is in auto mode. When one indicator portion is red and the other indicator portion is green it indicates that dry coal conveyor 50 is in the manual mode. When both indicators are green dry coal conveyor 50 is stopped. Similar to other devices, yellow indicators mean a locked out device, magenta indicator means a tagged out device and white indicators mean a tripped device.

In one example embodiment, an operator can select indicator 412b to open a new window and select start, stop or locked out. Control system 60 can also in communication with a level switch operative coupled to dry coal conveyor 50 to monitor the conveyance of rejected particulate material from sizing screen 40. If control system 60 does not detect rejected particulate material it can automatically stop dry coal conveyor 50.

Referring again to FIG. 3, an operator can select a blower icon 414 to set blower 78 to either auto mode or manual mode. The blower 78 has the same permissive requirements as dry coal conveyor 50 and can trip if dry coal conveyor 50 is not operating. In one example embodiment, there is a time delay before shutting off blower 78 to permit additional drying of the particulate material thereon. In embodiment, the time delay can be 30 seconds, however, any time can be programmed into control system 60. Referring to FIG. 4, blower 78 includes a blower icon 414b to indicate the status of blower 78 to the operator. In one embodiment, if a portion of blower icon 414b is red it indicates its running. If a portion of blower icon 414b is green it indicates blower 78 has stopped. A magenta color indicates the device is tagged out. Other color schemes, patterning and the like such as all grey can be used to indicate a loss of power to blower 78. A bad PV can be indicated by magenta on grey, crosshatch, gradient or the like.

Referring again to FIG. 3, an operator can select a bucket elevator icon 416a to set bucket elevator 52 to either auto mode or manual mode. The bucket elevator 52 has permissive requirements of operation of dry coal conveyor 50 and an un-plugged state of chute 47. Bucket elevator 52 can be tripped if chute 47 becomes plugged, dry coal conveyor 50 is not operating, low speed is detected or if an explosion is detected.

Referring to FIG. 4, a bucket elevator indicator 416b is provided to permit an operator to monitor the status of bucket elevator 52. In one example embodiment, an operator can select bucket elevator indicator 416b to open another window to select start, stop and lock out bucket elevator 52.

In one embodiment, if bucket elevator indicator 416b is red it indicates it's running. If bucket elevator indicator 416b is green it indicates it is non-operational. In another example embodiment, there are at least two bucket elevator indicator portions 416b to indicate various states of the bucket elevator 52. If both indicator portions are red it indicates it is running in auto mode. If one indicator portion is red and another indicator portion is green it is running in manual mode. If both indicator portions are green it indicates it is non-operational. Similar to other devices, yellow indicators mean a locked out device, magenta indicator means a tagged out device and white indicators mean a tripped device.

The explosion suppression system operatively disposed in bucket elevator 52 is kept in an energized and armed state whenever bucket elevator 52 is operating. In one example embodiment, control system 60 can monitor the pressure of gases within bucket elevator 52. Upon the detection of an explosion pressure spike control system 10 control system 60 can actuate and causes the discharge of inert chemicals from high pressure canisters. In another embodiment, explosion suppression system includes a control panel that permits the device to be turned on and off. It can also house the circuitry that monitors the pressure level and discharges the canisters appropriately. Control system 60 can also control a similar explosion suppression system operatively disposed to or within dryer 48 to suppress any fires that may develop. The control of the explosion suppression system for the dryer 48 is can be similar or identical to that of the bucket elevator 52.

The bucket elevator 52 deposits the rejected particulate material onto a bunker feed conveyor 80 that is also monitored and/or controlled by control system 60. Referring to FIG. 3, an operator can select a bunker conveyor icon 418a to set either auto mode or manual mode for bunker conveyor 80. Permissive operation of bunker conveyor 80 requires an un-plugged state of chute 47, full air pressure under conveyor belt of bunker conveyor 80, un-triggered belt alignment switch and operation of a blower 82 in fluid communication with bunker conveyor 80. If any of the permissive requirements are not met bunker conveyor 80 will be tripped and automatically shut down.

Referring to FIG. 4, an operator can monitor and/or control bunker conveyor 80 by a bunker conveyor indicator 418b that illuminates red if bunker conveyor 80 is operating and illuminates green if bunker conveyor 80 is not operating. In one example embodiment, there are at least two indicator portions 418b. When both indicator portions 418b are red bunker conveyor 80 is in auto mode. When one indicator portion is red and the other indicator portion is green it indicates that bunker conveyor 80 is in the manual mode. When both indicators are green bunker conveyor 80 is stopped. Similar to other devices, yellow indicators mean a locked out device, magenta indicator means a tagged out device and white indicators mean a tripped device.

In one example embodiment, an operator can select indicator 418b to open a new window and select start, stop or locked out. Control system 60 can also be in communication with a level switch operative coupled to bunker conveyor 80 to monitor the conveyance of rejected particulate material from sizing screen 40. If control system 60 does not detect rejected particulate material it can automatically stop dry coal conveyor 50.

Referring again to FIG. 3, an operator can select a blower icon 420a to set blower 82 to either auto mode or manual mode. The blower 82 has the same permissive requirements as bunker conveyor 80 and can trip if bunker conveyor 80 is not operating. In one example embodiment, there is a time delay before shutting off blower 80 to permit additional drying of the particulate material thereon. In one embodiment, the time delay can be 30 seconds, however, any time can be programmed into control system 60. Referring to FIG. 4, blower 80 includes a blower icon 420b to indicate the status of blower 80 to the operator. In one embodiment, if a portion of blower icon 420b is red it indicates its running. If a portion of blower icon 420b is green it indicates blower 80 has stopped. A magenta color indicates the device is tagged out. Other color schemes, patterning and the like such as all grey can be used to indicate a loss of power to blower 80. A bad PV can be indicated by magenta on grey, crosshatch, gradient or the like.

For particulate material or coal that is of a predetermined acceptable size, weight, and/or dimension, control system 60 controls a first feed conveyor 78a receiving the coal from sizing screen 40. Referring to FIG. 3, an operator can select a first feed conveyor icon 422a to place the first feed conveyor 78a in either an auto mode or a manual mode. Permissive operation of first feed conveyor 78a requires operation of a second feed conveyor 78b to catch the coal from the first feed conveyor 78a, chute 37 in an un-plugged state, emergency pull cords in non-pulled states and a belt alignment switch un-triggered. A change of state of any one or more of the required permissive states will trip first feed conveyor 78a, thereby stopping operations.

Turning now to FIG. 4, a first feed conveyor indicator 422b is provided to permit an operator to monitor and/or control first feed conveyor 78a. An operator can select indicator 422b to open another window to start, stop and/or lock out first feed conveyor 78a. Indicator 422b will illuminate red if first feed conveyor 78a is operating within predefined limits and/or there is no change in the states of the permissive requirements. If first feed conveyor 78a is not operating within predefined limits or there is a change of state of the permissive requirements, indictor 422b will be illuminated green. In one example embodiment, there are at least two first feed conveyor indicator portions 422b. When both indicator portions 422b are red it indicates first feed conveyor 78a is operating in auto mode. When one indicator portion is red and the other indicator portion is green it indicates first feed conveyor 78a is operating in manual mode. Again, when both indicator portions 422b are yellow the device is locked out, while two white indicator portions 422b indicate a tripped device. Two magenta indicator portions 422b indicate a tagged out device.

The acceptable raw coal from first feed conveyor 78a is deposited on second feed conveyor 78b, which then deposits the raw coal onto a third feed conveyor 78c that carries the raw coal to the dryer 48. Second and third feed conveyors 78b and 78c respectively have the same permissive requirements as first feed conveyor 78a except second feed conveyor 78b requires operation of third feed conveyor 78c and third feed conveyor 78c requires operation of air locks feeding dryer 48, no carbon indicated from sensors operatively disposed in a hood of dryer 48, and a temperature indication below 100 degrees Fahrenheit by sensor operatively disposed in dryer 48. If any of the permissive requirements for the respective feed conveyors is absent, the particular feed conveyor will be tripped and shut down.

As illustrated in FIG. 3, a second feed conveyor icon 424a and a third feed conveyor icon 426a is provided for the operator to select between auto and manual modes. Additionally, as illustrated in FIG. 4, a second feed conveyor indicator 424b and a third feed conveyor indicator 426b is provided for the operator to monitor and/or control the second and third feed conveyors respectively. The color or indication scheme illustrated by the second and third feed conveyor indicators 424b and 426b respectively are identical to the color scheme of first feed conveyor indicator 422b.

In one embodiment, a weigh scale is operatively disposed to third feed conveyor 78c to monitor the amount of coal material being conveyed into dryer 48. The weigh scale can send a signal back to control system 60 to gather and calculate measurements, totals, and history. Control system 60 can then archive the material for later retrieval. A permissive start of weigh scale requires third feed conveyor 78c operating. If dryer 48 stops operating weigh scale will trip and automatically shut down. In one embodiment, weigh scale operatively coupled to third feed conveyor 78c can feedback to vibrating feeder 36 to regulate the rate of feeding coal through coal handling 100 operations.

In one embodiment, control system 60 monitors and/or controls the speed of third feed conveyor 78c. Control system 60 is also in communication with a level switch that is in operative communication with third feed conveyor 78c to monitor if raw coal is conveyed from third feed conveyor 78c to dryer 48. As the raw coal is conveyed along third feed conveyor 78c weigh scale determines if a target or predetermined set point for feed rate to the particulate dryer 48 has been achieved. The weigh scale is in operative communication with the vibrating feeder 36 to increase or decrease the rate of raw coal through the system.

The raw coal is then feed from the third feed conveyor 78c into a hopper 44 that feeds directly into dryer 48. As the raw coal is conveyed or feed into hopper 44 control system 60 can monitor a level switch to monitor the amount of raw coal entering the dryer 48. Additionally, control system 10 is in communication with a level transmitter operatively disposed in hopper 44 to transmit a level of raw coal in the hopper 44. When a predetermined level is obtained level transmitter and/or control system 60 can regulate the operation of other components in the coal handling 100 to increase, reduce or stop the forward progress of the raw coal toward the dryer 48.

Referring to FIG. 1, at least one feeder vane or air lock 46 can be operatively disposed at a juncture between hopper 44 and dryer 48 to feed the raw coal into an interior of dryer 48. In one embodiment, air lock 46 is disposed in a conduit or bore such that there is not a continuous opening between the outer ambient environment and the interior of dryer 48. This ensures that fluidized coal does not float out of dryer 48 back through hopper 44. Other coal feeding configurations are also possible and are considered to be within the spirit and scope of the invention.

Referring to Coal Drying Auto Select GUI 400, an operator can select at least one air lock icon 460a to permit automatic operation of air lock 46. In one example embodiment, a second air lock icon 460b can be provided to control a second air lock assisting in feeding the raw coal into the dryer 48. The automatic operation of air lock 46 can increase the air lock's speed as control system 60 receives a signal from a level switch operatively disposed in hopper 44 indicating that the hopper 44 is full or nearly full. In one example embodiment of the invention, the air lock 46 will run at a speed generally greater than the actual feed rates to ensure that the hopper 44 is clear or empty.

Air locks 46 can also include a permissive-to-start requirement to start an air lock motor if the dryer 48 is ready to operate, fluidizing air is sensed by flow transmitters in the dryer 48, a first stage conveyor is running, and a dust collector fan is running. Other feedbacks effecting a permissive-to-start requirement are also possible and could include operation of any of the devices performing coaling handling functions, fluid handling and/or coal discharging. Air lock 46 can also include a trips-to-close requirement that automatically shuts down the air lock 46 if there is a low speed indication signal received from the crusher 38, there is a fire detected, a signal is received from a carbon monoxide detector that levels of carbon monoxide are greater than a predetermined level, there is an increased temperature above a predetermined level (e.g., 100 degrees F) detected by feed conveyor 78c, and/or there is a loss of pressure detected by a first stage 49a dryer pressure indicator that is transmitted to the control system by a pressure transmitter. Air lock 46 will also shut down if there is an emergency stop.

Referring to the Coal Drying Coal Conveying Overview GUI 420 of FIG. 4, at least one air lock indicator 462a is provided to permit an operator to monitor and/or control air lock 46. In one embodiment, a second air lock indicator 462b is provided to permit an operator to independently control separate air locks if they are provided. If an operator selects either indicator 462a or 462b it will create or bring up a new window or screen that permits the operator to start, stop, and/or lock out the device. Other types of selectable operations such as pause and purge are also possible.

In one embodiment, the air lock indicators 462a and/or 462b can change colors to notify the operator of the operational status of the device. For example, red indicators 462a and 462b indicate that the air locks 46 are running, green indicators 462a and 462b indicate that the air locks 46 are stopped, white indicators 462a and 462b indicate that the air locks 46 are tripped or shut down, yellow indicators 462a and 462b indicate that the air locks 46 are locked out, and magenta indicators 462a and 462b indicate that the air locks 46 are tagged out.

Under normal operation air locks 46 run in auto mode and cycle with system start and stop logic. If an operator puts them in manual mode they will run as long as run the permissive-to-start are met and trips-to-stop do not occur. In auto mode, when two air locks are utilized, if one becomes disabled or stops the other one will increase speed to maximum and the coal feed rate is restricted to a potentially programmable predetermined rate that is controlled by at least vibrating feeder 36.

Continuing with Coal Drying Coal Conveying Overview GUI 420 of FIG. 4, an air lock output point (OP) icon 464 is provided to allow an operator to input a desired set point for air locks 46. The air lock OP icon 464 can be selected to open another window or screen to input the desired set point. Referring to the Coal Drying Auto Select GUI 400 of FIG. 3, if the OP icon 464 is not available an operator can select, set and biases the air locks 46 by using a biasing input portion of GUI 420.

Once the raw coal is in the interior of the dryer 48, it can be fluidized to dry and separate the raw coal by size and/or weight Separation by weight is possible because a fluidization system lifts the lighter coal into the air while raw coal, potentially having increased levels of environmental impurities (e.g., sulfur and nitrogen) tend to be heavier, thereby causing them to sink or drop to the bottom of the dryer 48.

Referring to FIG. 1, several control system 60 can control several conveyors to move the heavier un-fluidized raw coal and the lighter dry coal from dryer 48. In one example embodiment, control system 60 can control a first stage conveyor 84a that is operatively coupled to the first stage 49a of dryer 48 to convey the heavier un-fluidized coal to a bunker 54. It can also control a transfer conveyor 84b disposed proximate the first stage conveyor to collect and transfer the raw coal from first stage conveyor 84a to the dry coal conveyor 50, which then takes it to bucket elevator 52 and then on to bunker 54. In another example embodiment, the raw coal from first stage conveyor 48a or transfer conveyor 48b can be collected, fluidized further or processed by another means to either dry the coal further or separate the coal from the environmental contaminants.

Referring to the Coal Auto Select GUI 400 of FIG. 3, an operator can use control system 60 to select auto control of first stage conveyor 84a and/or transfer conveyor 84b by selecting or checking a first stage conveyor icon 624a and a first stage transfer conveyor icon 624b. Whether first stage conveyor 84a and transfer conveyor 84b is in auto mode or manual mode, control system 60 can control its operation. Referring to Coal Drying Coal Conveying Overview GUI 420 of FIG. 4, and Coal Drying Air Flow Overview GUI 460 of FIG. 5, a first stage conveyor indicator 85a and transfer conveyor indicator 85b is provided on both GUI 420 and GUI 460 (identical numbering is used on GUI 420 and GUI 460 for consistence) operator can monitor and/or control first stage conveyor 84a and transfer conveyor 84b. Both of the indicators 85a and 85b provide an indication of its operational state by color. For example, red indicators 85a and 85b indicate the conveyors 84a and 84b are in a running state, green indicators 85a and 85b indicate that conveyors 84a and 84b are in a stopped state, white indicators 85a and 85b indicate that conveyors 84a and 84b are in a tripped or shut down state, yellow indicators 85a and 85b indicate that the conveyors 84a and 84b are in a locked out state, and magenta indicators 85a and 85b indicate that the conveyors 84a and 84b are in a tagged out state. Other types of identification means are possible such as numbers, pattern, and objects.

Figure 8A:
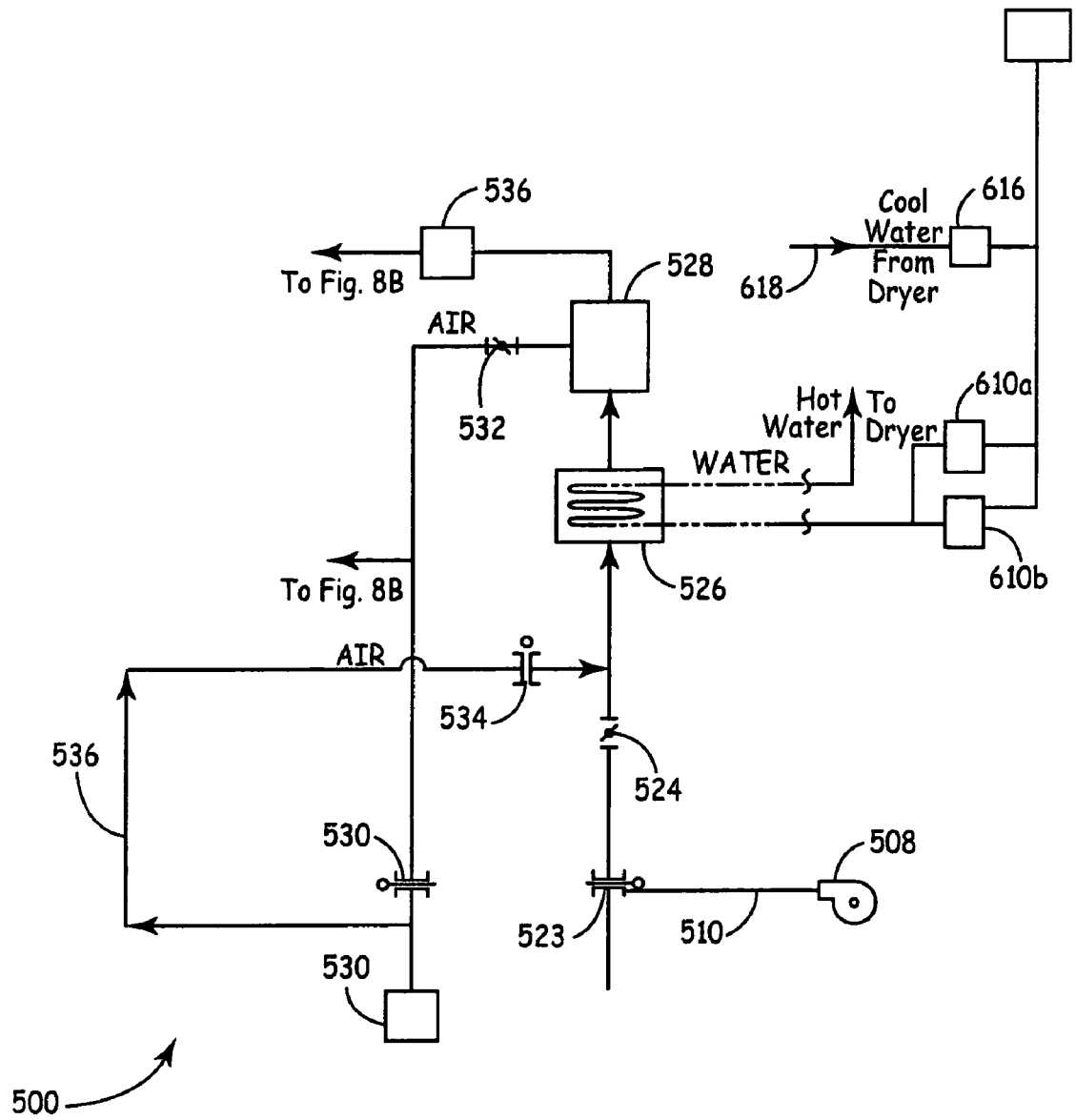
FIG. 8A is a schematic illustration of fluid handling and particularly fluid warming utilizing heated waste streams from other parts of the electric power plant.
Figure 8B:
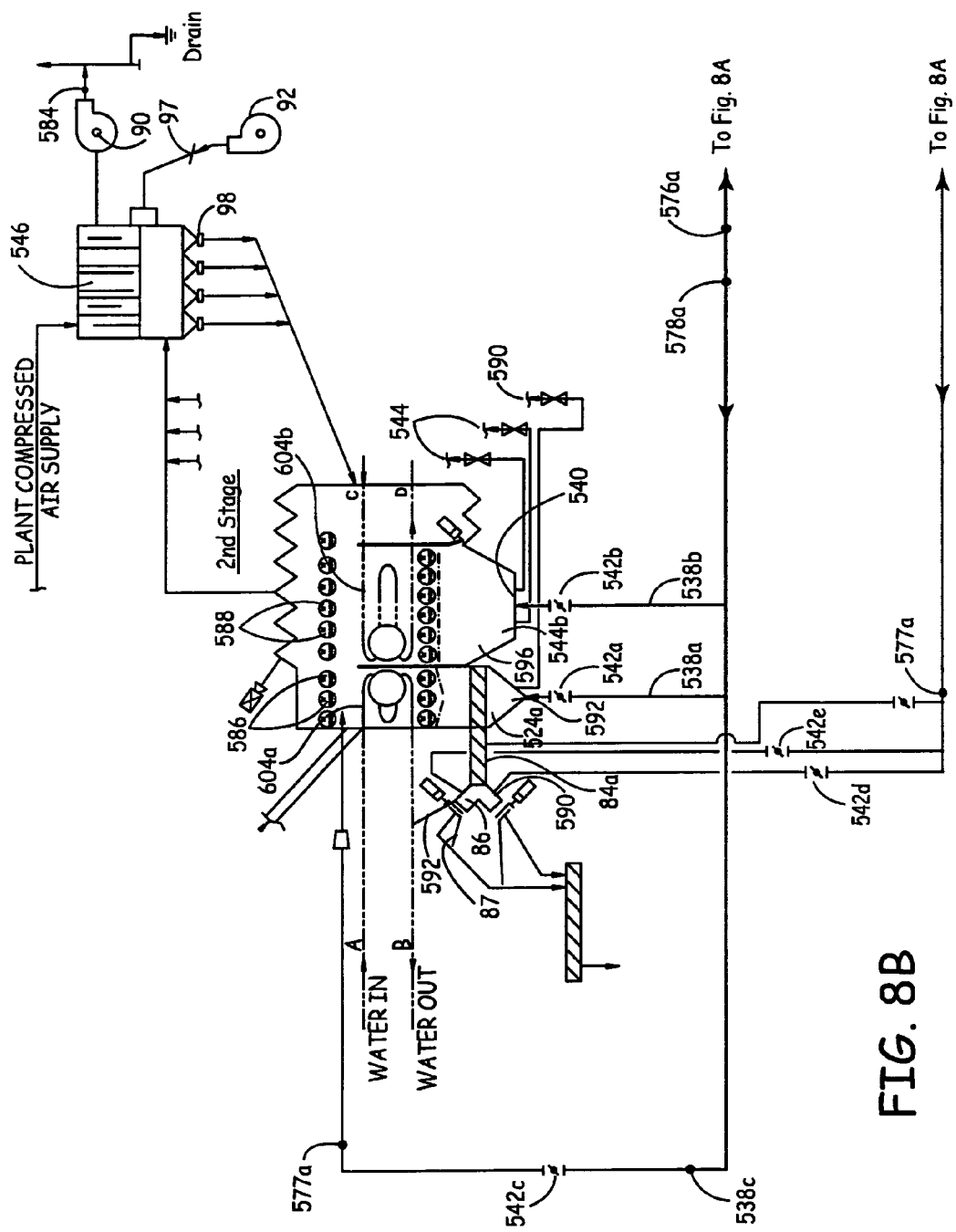
FIG. 8B is a schematic illustration of a coal dryer receiving the warmed fluids from the fluid handling operations of the electric power plant.

Referring to FIG. 8B, in one embodiment, the raw coal that is conveyed on conveyor 84a can travel through a scrubber box 86 that fluidizes and further separates fine coal particles from larger raw coal. These fine coal particles are sent back into the first stage 49a of dryer 48 for further fluidization. The remaining large raw coal can be discharged onto conveyor 84b through at least one discharge gate 87a. In one embodiment, as illustrated in FIG. 8B, there can be two discharge gates selectively cover a dual branched scrubber box. The discharge gate 87a is controlled by control system 60 in either the auto mode or manual mode. Referring to the Coal Drying Auto Select GUI of FIG. 3, an operator can select between auto mode and manual mode by selecting discharge gate icons or boxes 87b and 87c.

Figure 5:
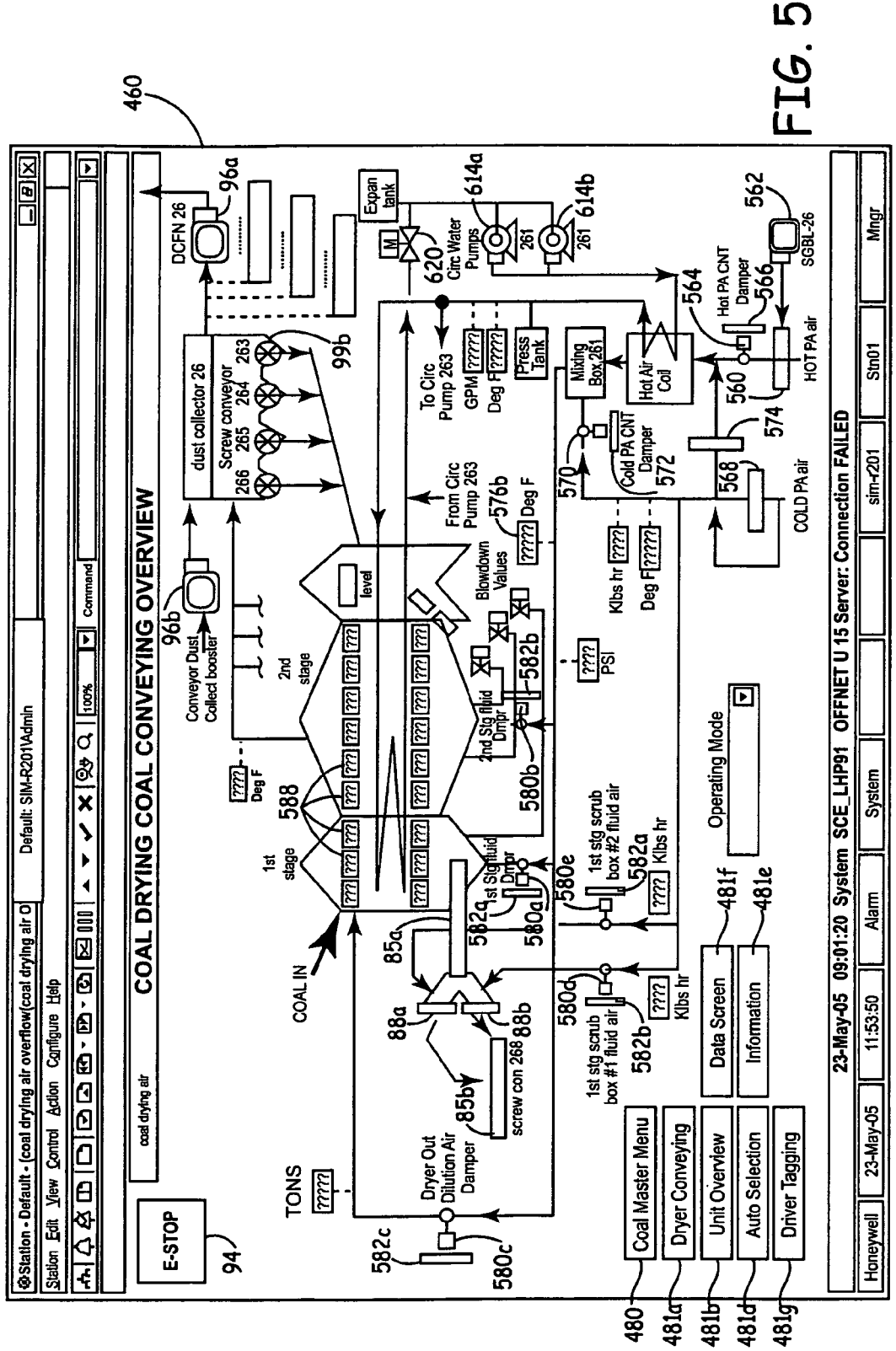
FIG. 5 is an interactive graphic user interface illustrating coal drying fluid flow overview for an electric power plant.

Referring to the Coal Drying Air Flow Overview GUI 460 of FIG. 5, discharge gate indicators 88*a* and 88*b* can display the discharge gate 87 operational status with color coding such as red indicators 88*a* and 88*b* indicate the discharge gate 87 is in an auto, manual, and/or open state, green indicators 88*a* and 88*b* indicate that discharge gate 87 is in a stopped or closed state, white indicators 88*a* and 88*b* indicate that discharge gate 87 is in a tripped or shut down state, yellow indicators 88*a* and 88*b* indicate that the discharge gate 87 is in a locked out state, and magenta indicators 88*a* and 88*b* indicate that the discharge gates 87 is in a tagged out state. Other types of identification means are possible such as numbers, pattern, and objects.

After the coal is fluidized and sent to the second stage 49*b* of dryer 48 it is discharged through at least one discharge air lock 468 onto dry coal conveyor 50. Referring to Coal Drying Auto Select GUI 400, an operator can select at least one discharge air lock icon 470*a*-470*c*, if there is more than one discharge air lock 468, to permit automatic operation of discharge air lock 468. The automatic operation of discharge air locks 468 can increase in speed as control system 60 receives a signal from a level switch operatively disposed dryer 48. By increasing in speed the discharge air lock 468 is able to more quickly empty dryer 48. In one example embodiment, of the invention, the air lock 468 will run at a speed generally greater than the actual feed rates to ensure that the dryer 48 is clear, empty, or at least does not become clogged with coal.

Air lock 468 can also include a permissive-to-start requirement to start a discharge air lock motor if a conveyor that feeds the dried coal away from the dryer is running. Other feedbacks effecting a permissive-to-start requirement are also possible. Air lock 468 can also include a trips-to-close requirement that automatically shuts down the air lock 468 if the conveyor taking the dried coal away from dryer 48 stops. Air lock 468 can also be automatically shut down if there is an emergency stop.

Referring to the Coal Drying Overview GUI 420 of FIG. 4, at least one discharge air lock indicator is provided to permit an operator to monitor and/or control discharge air lock 468. In one embodiment, three discharge air lock indicators 469*a*, 469*b* and 469*c* are provided to permit an operator to independently control separate air locks if they are provided. If an operator selects either indicator 469*a*-469*c* it will create or bring up a new window or screen that permits the operator to start, stop, and/or lock out the discharge air locks 469*a*-469*c*.

In one embodiment, the discharge air lock indicators 469*a*-469*c* can change colors to notify the operator of the operational status of the device. For example, red indicators 469*a*-469*c* indicate that the air locks 468 are running, green indicators 469*a*-469*c* indicate that the air locks 468 are stopped, white indicators 469*a*-469*c* indicate that the air locks 468 are tripped or shut down, yellow indicators 469*a*-469*c* indicate that the air locks 468 are locked out, and magenta indicators 469*a*-469*c* indicate that the air locks 468 are tagged out.

Under normal operation air locks 468 run in auto mode and cycle with system start and stop logic. If an operator puts the discharge air locks 468 in manual mode they will run as long as run the permissive-to-start requirements are met and trips-to-stop events do not occur. In auto mode, when at least two discharge air locks are utilized, if one becomes disabled or stops the other one will increase its speed to maximum and the coal feed rate will be restricted to a programmable predetermined rate that is controlled by at the least vibrating feeder 36.

Continuing with Coal Drying Overview GUI 420 of FIG. 4, an air lock output point (OP) icon 470 is provided to allow an operator to input a desired set point for air locks 468. The air lock OP icon 470 can be selected to open another window or screen to input the desired set point. Referring to the Coal Drying Auto Select GUI 400 of FIG. 3, if the OP icon 470 is not available an operator can select, set and biases the air locks 468 by selecting or entering the desired value in the biasing input 466.

Referring to FIGS. 1 and 8B, fine particulate matter such as coal dust is moved, blown, suctioned and the like from second stage 49*b* of dryer 48 to a dust collector 546 where it is collected and later used or disposed of. Referring to FIGS. 1 and 8B, a dust collector fan 90 upstream from the dust collector 546 and a dust collector bolster fan 92 down stream from the dust collector 546 aid in moving the fine coal dust into the dust collector 546.

Control of the dust collector can be by control system 60 or by a Dwyer control panel. Control of dust collector includes pulse type cleaning of dust bags and creating a pulse frequency based on differential pressure drops across tube sheets in the dust collector 546. Control system 60 can control permissive-to-start requirements that automatically start the dust collector 546. Examples of permissive-to-start requirements include if control system 60 senses that a predetermined amount of air pressure is detected in the dryer 48. The dust collector can also be tripped or automatically shut down if control system 60 senses that an amount of air pressure in the dryer 48 is below the predetermined limit; if a fire is detected; or if it receives a signal that dust particles are in the exhaust air, which could be caused by a broken bag sending out a signal or alarm. Control system 60 or the operator can then shut down the dryer 48 after a predetermined amount of time. The dust collector 546 can also shut down if there is an emergency shut down such as by an operator selecting or depressing an Emergency Button 94 on any of the GUIs 400, 420 or 460.

Dust collector fan 90 and dust collector booster fan 92 can also be controlled by monitored and/or controlled by control system 60. Referring to the Coal Drying Auto Select GUI 400 of FIG. 3, an operator can select between auto mode and manual mode by selecting dust collector fan icon 95*a* and/or dust booster fan icon 95*b*. In the auto mode control system 60 will increase the speed of the fan when it senses a pressure somewhere in the system below a predetermined limit. Control system 60 can also control the fan's motor such that it can have a soft start or a speed ramp up. In one embodiment the dust collector fan 90 will automatically stop if dampers controlling the fluid entering the dryer 48 closed or if the dust collector booster fan 92 is off Dust collector fan 90 can also be tripped or shut down if control system 60 senses a fire, or there is a broken dust bag emitting dust particles into the exhaust. Pressing the emergency stop button 94 will also trip the dust collector fan.

The dust collector booster fan 92 will automatically start if dust collector fan 90 is running and will automatically stop if any of the conveyors 50, 78*a*, 78*b*, and 78*c* stop, if the crusher 38 stops or the vibrating feeder 36 stops. The dust collector booster fan 92 will also automatically stop if a fire is detected or someone presses the emergency stop button 94.

Referring to Coal Drying Coal Conveying Overview GUI 420 of FIG. 4, and Coal Drying Air Flow Overview GUI 460 of FIG. 5, a dust collector fan indicator 96*a* and a dust collector booster fan indicator 96*b* are provided to permit an operator to monitor various operational states of fans 90 and 92. The indicators 96*a* and 96*b* will turn red when running in auto or manual mode, and will turn green when they are stopped. The fans 96*a* and 96*b* will turn white if they are tripped and will turn yellow when they are locked out. Lastly, the fans 96*a* and 96*b* will turn magenta if they are tagged out for repairs or cleaning. In one embodiment, the control of dust collector booster fan is accomplished via a manual flow control 97.

Once the fine coal particles are collected in the dust collector 564 they can be conveyed to storage or burning in a furnace. Referring to FIG. 8B, in one embodiment, at least one dust collector conveyor 98 is operatively coupled to the dust collector 546 to convey the fine coal dust away from the dust collector 546. Referring to the Coal Drying Auto Select GUI 400 of FIG. 3, an operator can select a dust collector conveyor icon 99a to switch the conveyor 98 between auto and manual modes. In one embodiment of the invention, as illustrated in FIG. 3, multiple dust collector conveyor icons can be displayed to allow the operator to select which conveyors to run automatically and which to run manually. Referring to the Coal Drying Air Flow Overview GUI 460 of FIG. 5, at least one dust collector conveyor indicator 99b is provided to display the various operational states of the conveyor 98.

In one example embodiment, control system 60 will turn on conveyor 98 when the dust collector 546 turns on and will shut off if the dust collector 546 shuts off. The control system 60 also allows permissive-to-start requirements that will start conveyor 98 if the discharge air locks 468 are running and will automatically be tripped or shut down if control system 60 senses hopper 44 is full, a low speed of fine particulate coming from conveyors 98 is sensed, or the discharge air locks of the second stage 49b are not running. Lastly, conveyor 98 will also automatically shut down if an operator presses the emergency stop button 94.

Control of Fluid Handling

As described in more detail in the incorporated references and briefly described above, raw fluids such as air and water fluidize and dry the raw coal in dryer 48. An advantage of the present invention is that coal need not be dried to absolute zero moisture levels in order to fire the power plant boilers on an economically viable basis. Instead, by using and controlling available waste heat sources to dry the raw coal to a sufficient level, the boiler efficiency can be markedly increased, while maintaining the processing costs at an economically viable level. This provides true economic advantage to the plant operator. Reduction of the moisture content of lignite coals from a typical 39-60% level to 10% or lower is possible, although 27-32% is preferable. This preferred level is dictated by the boiler's ability to transfer heat. Control system 60 preferably controls multiple plant waste heat sources entering dryer 48 in various combinations and methods to dry the raw coal or other particulate material without adverse consequences to plant operations.

In a typical power plant, waste process heat remains available from many sources for further use. One possible source is a steam turbine. Steam may be extracted from the steam turbine cycle to dry the raw coal. Another possible source of waste heat for drying raw coal is the thermal energy contained within flue gas leaving the plant. In a Rankine power cycle, heat is rejected from the cycle in the steam condenser and/or cooling tower. Heat rejected in a steam condenser typically used in utility plants represents a large source of waste heat, the use of which for a secondary purpose minimally impacts plant operation. A portion of this hot condenser cooling water leaving the condenser could therefore be diverted and used instead for coal drying. Engineering analyses show that, at full unit load, only 2% of the heat rejected in the condenser is needed to decrease coal moisture content by 4% points. Utilization of this heat source, solely or in combination with other available plant waste heat sources, provides optimal use of plant waste heat sources without adverse impact on plant operations.

Referring now to FIGS. 4 and 5, control system 60 indicates or displays a multi-staged fluidized bed drier. However, both single and multiple-stage dryers can be utilized to pre-dry and further clean the material before it is consumed within the industrial plant operation. Other commercially known types of dryers may be employed with control system 60 of the present invention. The heat treatment apparatus associated with the controller system 60 of the present invention also provides a system for removing fly ash, sulfur, mercury-bearing material, and other harmful pollutants from the coal using the material segregation and sorting capabilities of fluidized beds, in contrast to current prior art systems that attempt to remove the pollutants and other environmental contaminates after the coal has been burned. Removal of such pollutants and other environmental contaminants before the coal is burned eliminates potential harm that may be caused to the environment by the contaminants in the plant processes, with the expected benefits of lower emissions, coal input levels, auxiliary power needs to operate the plant, plant water usage, equipment maintenance costs caused by metal erosion and other factors, and capital costs arising from equipment needed to extract these contaminants from the flue gas.

Figure 9:
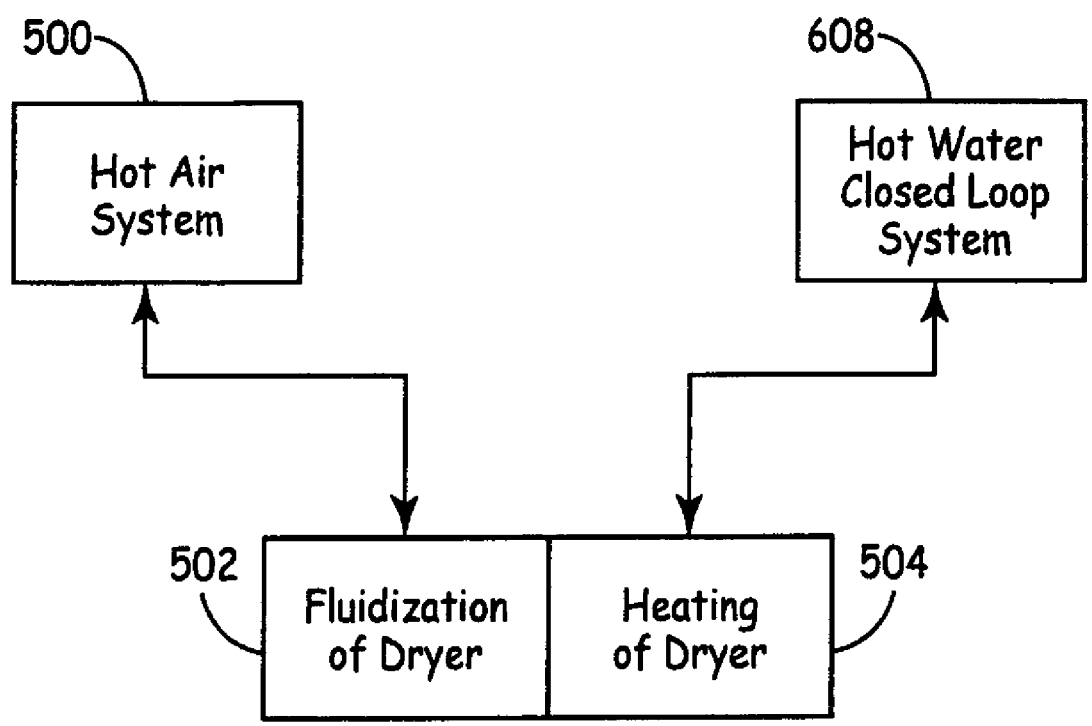
FIG. 9 is a flow diagram of portions of the fluid handling operations of the electric power plant the portions of the dryer they operate.

Turning now to FIGS. 8A and 8B, schematics illustrating fluid (air and/or water) flow or fluid handling into, through and out of dryer 48 is provided. Control system 60 monitors and/or controls various devices that regulate the flow rates and temperatures of the fluids. In one example embodiment, dryer 48 uses two processes to lower the moisture content of raw coal and carry away the excess moisture. Referring to FIG. 9, in basic terms, which are described in greater detail in the incorporated applications, there is a hot air system 500 and a closed loop hot water system 608 that work together to increase an internal temperature of dryer 48 that is needed to dry the raw coal.

Control of Hot Air System Entering Dryer

The hot air system 500 fluidizes and heats the raw coal in dryer 48. Additionally, hot air system 500 carries off excess moisture from the raw coal, thereby aiding in drying the raw coal. In one example embodiment, hot hair system 500 can receive heated primary air (PA) from air heated by steam waste heat, condenser waste heat and/or flue gas waste heat. Hot PA is taken or blown by a hot PA blower 508 fluidly coupled to a duct downstream of an air heater that increases the temperature of the hot PA. The flow of hot PA is regulated by isolation gate 523. The hot PA is further regulated by an upstream control damper 524. After passing through control damper 524, hot PA enters hot air coil 526 where it is warmed to a predefined or selectable temperature. Once warmed in hot air coil 526 the hot PA flows into mixing box 528 where it blends with cold PA air that is taken from a duct downstream of the PA fan 530. Cold PA then flows into an air heater where it is warmed to a predefined or selectable temperature. After flowing from the air heater, cold PA flows through an isolation gate 530 then to a control damper 532 before entering mixing box 528 where it blends with the hot PA.

A cold PA bypass 536 comprising a 12 inch diameter duct is disposed between the cold PA and an upstream side of hot air coil 526. This air duct has a cold PA bypass gate 534 that regulates the flow of cold PA to hot air coil 526 to cool the hot air coil 526 during routine maintenance and repair. In one embodiment of the invention, gate 534 is pneumatically operated. However, mechanical, electrical and mechanical-electrical devices can be utilized to regulate the flow of cold PA to hot air coil 526.

The fluidizing air destined for dryer 48 is blended at the mixing box 528 by a static blending device 536, known to those skilled in the art, which is inserted inside a 70×70 inch square duct at the discharge of mixing box 528. Referring to FIG. 8B, the warmed fluidizing air splits into multiple ducts 538a and 538b before it travels across the air heater floor 540 to the dryer 48. Each individual duct is designed to have a long straight section so flow measuring devices can be used on each duct feeding the dryer 48. In one example embodiment, a first fluidizing damper 542a and a second fluidizing damper 542b are in fluid communication with ducts 538a and 538b to regulate an amount of fluidizing air entering a first stage 544a and a second stage 544b of dryer 48 respectively.

After fluidizing the raw coal, the fluidizing air or exhaust air passes from the dryer 48 to a bag house or dust collector 546 through six short vertical ducts from the roof of the dryer 48 to the bottom of the bag house 546. In one example embodiment, the ducts do not have dampers. However, in other embodiments the ducts can include dampers to regulate the flow of exhaust air into dust collector 546. In another embodiment, there is a temperature and/or humidity probe located in at least one of the ducts to measure the temperature and/or humidity of the exhaust air. Initially these instruments may need to be moved to each of the ducts to check variability of the exhaust gas conditions.

In one example embodiment, the dust collector 546 is a pulse type with cloth filter bags over cages. The bag pulse frequency can be controlled by a timer provided by the bag house supplier. Exhaust air leaves the dust collector 546 to an induced draft fan 548 that is in fluid communication therewith. The induced draft fan 548 can then discharge to a vertical stack 550 that carries the moisture laden exhaust gas through the roof of a building.

Referring to FIG. 3, an operator is able to select between auto mode and manual mode of the above describe fluid regulating devices. In one example embodiment, an operator can select or check a hot PA shutoff gate icon 556a, a hot PA shutoff blower icon 556b, a hot air control damper icon, 556c, a cold PA shutoff icon 556d, a cold air control damper icon 556e, and/or a cold PA bypass icon 556f to place the selected devices into or out of auto mode.

Referring to FIG. 5, after placing the fluid regulating devices in either auto mode or manual mode an operator is able to monitor the operational status of each of the devices by monitoring coal air flow overview GUI 460 of FIG. 5. In one example embodiment, GUI 460 includes a hot PA shutoff gate indicator 560 that monitors whether the gate 523 is in an open state or a closed state. In an example embodiment, hot PA shutoff gate indicator 560 comprises at least two indicator portions. Dual red indicator portions indicate an open gate state and dual green indicator portions indicate a closed gate state. One red indicator portion and one green indicator portion indicates a gate in mid travel. Dual yellow indicator portions indicate a gate in a locked out state, and dual magenta indicator portions indicate a gate in a tagged out state.

In one embodiment, a single click or similar selection by an operator on hot PA shutoff gate indicator 560 will bring up another window or screen that allows the operator to control the state of hot PA shutoff gate 523. A double click or similar selection by an operator on hot PA shutoff gate indicator 560 will bring up another window or screen that displays the point detail of the hot PA shutoff gate 523. Control system 60 can also control an auto feature of hot PA shutoff gate 523 for sequential starting and stopping of coal drying and a trip to close when required by logic of software 74 whether in manual mode or auto select mode.

An operator (manually) or control system 60 (automatically) closes hot PA shutoff gate 523 during normal shut down and opens hot PA shutoff gate 523 when dryer 48 is running. Hot PA shutoff gate 523 can have a permissive-to-open requirement of requiring that hot air control damper 524 is closed. Hot PA shutoff gate 523 will trip or shut down if there is an emergency stop, a fire is detected, various high temperature alarms are triggered, such as high temperature of circulating water in a discharge portion of hot air coil 526, or if there is a pulverizer/boiler upset condition.

Continuing with FIG. 5, GUI 460 also includes a hot PA blower icon 562 to monitor the status of hot PA blower 508. When blower icon 562 is red it indicates to an operator that the blower 508 is operation or on. When blower icon 562 is green it indicates to an operator that the blower 508 is non-operational or in an off state. A white blower icon 562 means that the blower is tripped or in a shutoff state, a yellow blower icon 562 means that the blower 508 is in a locked out state, and a magenta blower icon 562 means that the blower 508 is in a tagged out state. In one example embodiment, an operator can select blower icon 562, which will bring up another window or screen that allows the operator to select between the various states.

Control system 60 also controls permissive requirements of blower 508. Since the shutoff blower 508 is used to seal air on the shutoff gate 523 when in its closed state, blower 508 includes a permissive-to-start requirement of having hot PA gate 523 closed. Therefore, when gate 523 closes blower 508 automatically starts. In one example embodiment, blower 508 also includes a trip-to-start requirement when gate 523 closes to ensure that a proper air seal is created. Similarly, blower 508 includes a trip-to-stop requirement when gate 523 is open. This ensures that blower 508 does not blow the hot PA through hot air coils too quickly.

Referring to GUI 460 of FIG. 5, a hot PA control damper icon 564 displays the status or state of hot PA control damper 524. For example, a red hot PA control damper icon 564 indicates that the damper 524 is in an open state or at the maximum open limit predefined and programmed in control system 60. A green hot PA control damper icon 564 indicates that the damper 524 is in a closed state or at it closed maximum. A grey hot PA control damper icon 564 indicates that the damper 524 is at a mid travel or controlling position.

At least one position bar 566 can be provided on GUI 460 generally adjacent to hot PA control damper icon 564 to display the relative open/closed position of damper 524. In one embodiment, a second position bar can be provided to indicate OP (?). Each of the position bars can be color coded.

An operator can select hot PA control damper icon 564 to place damper 524 into an auto mode, a manual mode, or a cascade mode. In auto mode and/or cascade mode, control system 60 balances the amount of hot PA and cold PA entering mixing box. In one embodiment, control system 60 receives inputs from a temperature sensor at a discharge of mixing box 528, utilizes predefined set points to determine the proper air flow of hot and cold PA.

Control system 60 also controls permissive requirements of hot air control damper 524. In one example embodiment, a permissive-to-open requirement includes if cold air control damper 532 is near a predefined target and a cold PA shutoff gate 530 is open. Hot air control damper 524 also includes a trip-to-close requirement when emergency stop is required, fire is detected and/or a high temperature (e.g., greater than 300 degrees Fahrenheit) of circulating water at a discharge port of hot air coil 526 is detected or a high temperature and/or uncontrolled temperature (e.g., greater than 350 degrees Fahrenheit) is detected at beyond the mixing box 528.

Referring to GUI 460 of FIG. 5, a cold PA shutoff gate indicator 580 is provided that monitors whether the gate 530 is in an open state or a closed state. In an example embodiment, cold PA shutoff gate indicator 580 comprises at least two indicator portions. Dual red indicator portions indicate an open gate state and dual green indicator portions indicate a closed gate state. One red indicator portion and one green indicator portion indicates a gate in mid travel. Dual yellow indicator portions indicate a gate in a locked out state, and dual magenta indicator portions indicate a gate in a tagged out state.

In one embodiment, selection by an operator on cold PA shutoff gate indicator 580 will bring up another window or screen that allows the operator to control the state of cold PA shutoff gate 530. Control system 60 can also control an auto feature of cold PA shutoff gate 530 for sequential starting and stopping of coal drying and a trip to close when required by logic of software 74 whether in manual mode or auto select mode.

An operator (manually) or control system 60 (automatically) closes cold PA shutoff gate 530 during normal shut down and opens cold PA shutoff gate 530 when dryer 48 is running. Cold PA shutoff gate 530 can have a permissive-to-open requirement of requiring that cold air control damper 523 is closed. Cold PA shutoff gate 530 will trip or shut down if there is an emergency stop, a fire is detected, or there is a pulverizer/boiler upset condition.

Referring to GUI 460 of FIG. 5, a cold PA control damper icon 570 displays the status or state of cold PA control damper 532. For example, a red cold PA control damper icon 570 indicates that the damper 532 is in an open state or at the maximum open limit predefined and programmed in control system 60. A green cold PA control damper icon 570 indicates that the damper 532 is in a closed state or at its closed maximum. A grey cold PA control damper icon 570 indicates that the damper 532 is at a mid travel or controlling position.

At least one position bar 572 can be provided on GUI 460 generally adjacent to cold PA control damper icon 570 to display the relative open/closed position of damper 532. In one embodiment, a second position bar can be provided to indicate OP (?). Each of the position bars can be color coded to assist the operator in monitoring the status of damper 532.

An operator can select cold PA control damper icon 570 to place damper 532 into an auto mode, a manual mode, or a cascade mode. In auto mode and/or cascade mode, control system 60 controls cold PA control damper 570 to control a pressure downstream of mixing box 528 and coordinates control with the hot air control damper 524 for proper energy balance, temperature, and flow requirements. In one example embodiment, control system 60 will use hot PA first to achieve a predefined temperature and flow. It will then use cold PA to prevent over temperature conditions while maintaining the predefined flow. Other combinations or mixing can also be done to obtain the proper temperature and/or flow.

Control system 60 also controls permissive requirements of cold air control damper 532. In one example embodiment, a permissive-to-open requirement includes if cold PA shutoff gate 530 is open. A trips-to-close damper requirement occurs if there is an emergency shut down or if a fire is detected.

When the hot air coil 526 and/or the mixing box 528 need to be repaired, inspected, and the like cold PA can be diverted through cold PA bypass gate 534 to cool them down. In one embodiment, cold PA bypass gate 534 is manually operated by either an operator on the plant floor or by a control room operator uses control system 60. GUI 460 includes a cold PA bypass gate indicator 574 to display the different states of cold PA bypass gate 534. In one embodiment, a red cold PA bypass gate indicator 574 indicates the bypass gate 534 is in an open state, a green cold PA bypass gate indicator 574 indicates the bypass gate 534 is in a closed state, a yellow cold PA bypass gate indicator 574 indicates the bypass gate 534 is in a locked out state, and a magenta cold PA bypass gate indicator 574 indicates that the bypass gate 534 is in a tagged out state. In one embodiment, cold PA bypass gate indicator 574 comprises at least two indicator portions. In this embodiment, when one indicator portion is red and the other indicator portion is green it means that the bypass gate 534 is in mid-travel between opening and closing. The cold PA bypass gate 534 will automatically open if the hot PA shutoff gate 523 is closed and a temperature, generally greater than 200 degrees Fahrenheit, of hot PA flowing into hot air coil 526 is detected. The cold PA bypass gate will automatically close if there is a pulverizer/boiler upset condition, a fire is detected, or there is an emergency stop.

Referring to FIGS. 8A and 8B, and as briefly discussed above, as the blended air flows from the mixing box 528 it flows through ducting 538a and 538b which feed or flow directly into a bottom of the first stage 49a and second stage 49b of dryer 48 to fluidize and dry the coal. The blended air also flows through sparging or dilution duct 538c and into a top of the dryer 48 to further fluidize and draw moisture out of the fluidized coal. Cold PA is also diverted toward dryer 48. In order to be able to monitor the temperature of the blended air and cold PA entering the dryer 48, at least one temperature sensor 576a is operatively disposed to the ducting. Additionally, at least one flow meter 577a is operatively disposed to at least one, but preferably all of ducts 538a-538c to measure the flow rate of the blended air through ducts 538a-538c. Lastly, at least one pressure meter 578a is operatively disposed to at least one, but preferably all, of ducts 538a-538c to measure the pressure of the blended air or fluids entering the dryer 48. Sensors and/or monitors can be operatively disposed in any of the ducting feeding into, through, or out of dryer 48 to ensure that all operations are monitored and controlled.

Referring to FIG. 5, an operator can monitor each of the measurements of the sensors 576a, 576a, 577a, and 578a by observing GUI 460. Graphic User Interface 460 includes at least one blended air temperature sensor icon 576b to display to an operator the temperature of the blended air in the ducting. Additionally, at least one flow meter icon 577b is provided to display the pressure of the blended air or other fluids through the ducts. Lastly, at least one pressure meter icon 578b is provided to display the pressure of the blended air or other fluids through any of the ducts. In one embodiment, the measurements will be automatically displayed as they are sent to GUI 460 by control system 60 as they are received by sensors 576a, 577a, and 578a. In another embodiment, the sensor icons 576b, 577b, and 578b can either be wave over or clickable to display a separate window or screen with the received measurements.

Referring to FIG. 8B, the blended air flow entering the dryer is regulated by dampers 542a, 542b, and 542c. Cold PA flowing into dryer 48 is regulated by dryers 542d and 542e. A first stage damper 542a is in fluid communication with the first stage 544a of dryer 48 and a second stage damper 542b is in fluid communication with the second stage 544b of the dryer 48. A dryer outlet dilution air damper 542c is in fluid communication with a top side of dryer 48. A first stage scrub box damper 542d is in fluid communication with a first stage scrubber box 590 that is in fluid communication with the first stage 544a of dryer 48. Lastly, a second stage scrub box damper 542e is in fluid communication with a second stage scrubber box 592 that is in fluid communication with the first stage 544a of dryer 48.

An operator can utilize control system 60 to control each of the dampers 542a-542e, thereby regulating the flow of the blended air and cold PA into the respective parts of dryer 48 and the first stage 590 and second stage 592 of the scrubber box. Referring to FIG. 3, GUI 400 includes a first stage fluidizing damper icon 558a, a second stage fluidizing damper icon 558b, a first stage scrubber damper icon 558c, and a second stage scrubber damper icon 558d to permit an operator to monitor the operation of each of the dampers 542a, 542b, 542c, 542d, and 542e regulating the flow of the blended air into dryer 48. An operator can selecting or check any of the icons 558a-558e to allow control system 60 to automatically control dampers 542a, 542b, 542c, 542d, and/or 542e. In the auto mode, control system 60 modulates dampers 542a-542e to control flow into dryer 48. In the manual mode an operator can enter parameters for each of the dampers 542a-542e in the data screen (?).

Referring to FIG. 5, GUI 460 includes a first stage fluidizing damper icon 580a, a second stage fluidizing damper indicator 580b, a dryer outlet damper indicator 580c, a first stage scrubber damper indicator 580d, and a second stage scrubber damper indicator 580e, all of which permit an operator to monitor the operation of each of the dampers 542a, 542b, 542c, 542d, and 542e regulating the flow of the blended air and cold PA into dryer 48. Each of the damper indicators 580a-580e can indicate various operational states to the operator. The indicators can be a color, pattern, number, or the like. In one embodiment, a red color indicates that the dampers 542a, 542b, 542c, 542d, and 542e are in an open state or at their maximum open limit predefined and programmed in control system 60. A green color indicates that the dampers 542a, 542b, 542c, 542d, and 542e are in a closed state. A grey color indicates that the dampers 542a, 542b, 542c, 542d, and 542e are at a mid-travel or controlling position.

GUI 460 can also include at least one first stage position bar 582a proximate the first stage damper indicator 580a, at least one second stage position bar 582b proximate the second stage damper indicator 580b, and at least one dryer outlet damper position bar 582c proximate the dryer outlet air damper indicator 580c. Additionally, GUI 460 can include a first stage scrubber position bar 582d proximate the first stage scrubber damper indicator 580d and a second stage scrubber position bar 582e proximate the second stage scrubber damper indicator 580e. Each of the position bars 582a-582e display the relative open/closed position of dampers 542a-542e. Each of the position bars 582a-582e can be color coded to assist the operator in monitoring the status of dampers 542a-542w.

Control system 60 also controls permissive requirements of each of the dampers 542a-542e. The first stage air damper 542a will close when as flow meter inline with the first stage air damper 542a increases beyond a predefined flow rate. In one example embodiment, a permissive-to-open requirement includes if the dryer 48 is ready to operate, pressure at mixing box 528 is at a predefined target, plus or minus an allowable deviation, temperature in the air stream leaving the mixing box 528 is not greater than 150 degrees, temperature in the first stage 544a of dryer 48 is not greater than 140 degrees Fahrenheit, there is no indication of carbon monoxide detected by a carbon monoxide sensor 584 disposed outside of the dust collector 546, and the dust collector 546 is running. The first stage air damper 542a also ha a permissive-to-close requirement if the coal feed has stopped. Lastly, the first stage air damper 542a has a trip-to-close requirement when there is a fire detected, a temperature in the air stream leaving the mixing box 528 is greater than 350 degrees Fahrenheit, any thermal sensor 586 in the first stage 544a of the dryer 48 is greater than 170 degrees Fahrenheit, if carbon monoxide is detected by the carbon monoxide sensor 584, the dust collector is not running, or there a pressure at the top of the dryer bed greater than a predefined limit.

The permissive requirements for the second stage air damper 542b is the same a the permissive requirements for the first stage air damper 542a, except that the second stage air damper 542 will automatically open if control system 60 receives signals from any of the thermal sensors 588 in the second stage 544b of dryer 48, the exhaust duct, or a signal is received that the dust collector has an internal temperature less than 140 degrees Fahrenheit. Additionally, the second stage air damper 542b will automatically close if the control system 60 receives a signal from any of the thermal sensors 588 that the interior of the second stage 544b is greater than 180 degrees Fahrenheit.

The permissive requirements of the dryer outlet dilution air damper 542c include regulating its closing if control system 60 receives a signal from an air flow meter with an increased air flow rate. It also includes a permissive-to-open requirement when the dryer 48 is ready to operate, and/or the pressure at the mixing box 528 is at its predetermined target pressure. The dryer outlet dilution air damper 542c will be tripped or shutoff if control system 60 receives a signal of a fire, if the pressure at the mixing box 528 varies from the predefined target pressure by more than a predefined allowable deviation, if the dust collector fan is running, and/or there is an emergency stop.

The permissive requirements for the first stage scrubber box damper 542d and the second stage scrubber box damper 542e are the generally the same. However, depending upon the application their permissive requirements may also be different to optimize the efficiencies of the practiced process. In an example embodiment where they are the same, if control system 60 receives a signal from flow meters 577a downstream of the dampers 542d and 542e it indicates that the flow rate has increased and either one or both of the dampers 542d and/or 542e will close. Permissive-to-open requirements include if the dryer 48 is ready to run or operate, if the pressure at mixing box 528 is generally greater than a predefined target pressure, a signal is received from any of the first stage 544a thermal sensors 586 indicating an increase in an internal temperature greater than 140 degrees Fahrenheit, no signal is received from the carbon monoxide sensor 584 indicating the presence of carbon monoxide, and the dust collector fan is running. Lastly, the first stage scrubber box damper 542d and/or the second stage scrubber box damper 542e include the trip-to-close command when there is a fire detected, when a temperature greater than 350 degrees Fahrenheit is detected in the air stream leaving the mixing box 528, when a signal is received from any of the thermal sensors 588 in either of the stages 544a and/or 544b of the dryer 48 that their internal temperature is greater than 170 degrees Fahrenheit, there is a signal received from the carbon monoxide sensor 584 that there is a presence of carbon monoxide, if the dust collector fan is not running, if a signal is received from a pressure sensor 578a that there is an increased pressure at the top of the dryer 48 bed, and/or there is an emergency stop.

Referring to FIG. 8, control system 60 also controls at least one first stage blowdown valve 590 in fluid communication with a plenum 592 of the first stage 544a of dryer 48 and at least one second stage blowdown valve 594 in fluid communication with a plenum 596 if the second stage 544b of dryer 48. The first stage blowdown valve 590 and the second stage blowdown valve 594 are periodically opened to clean dust build-up in the clean air plenums 592 and 596. When the blowdown valves 590 and 594 are opened any dust is blown up to the dust collector 546 where it is collected and either processed or disposed.

Referring to GUI 400 of FIG. 3, an operator can select a first stage blowdown icon 600a and at least one second stage blowdown icon 600b to set first stage blowdown valve 590 and/or second stage blowdown valve 594 in auto mode. In auto mode, control system 60 can regulate the time delay between openings and the length of time that each of the blowdown valves 590 and 594 are open. In one example embodiment, the time delay or frequency of opening can be between 2 and 120 minutes. The length of time open can be from anywhere between 10 to 120 seconds. Although ranges for the time delay and length of time open have been provided, one skilled in the art will appreciate that any range is permissible depending upon the process being practiced and the needs of the operator. Control system 60 also controls the permissive-to-open requirements of the blowdown valves 590 and 594. In one embodiment, the permissive-to-open requirement is if a differential pressure is indicated between the first stage 544a and the second stage 544b of dryer 48. The differential pressure required to trigger the opening of the blowdown valves 590 and 594 can be set by the operator. The blowdown valves 590 and 594 will automatically close if there is an emergency shutdown.

GUI 460 of FIG. 5, includes a first stage blowdown indicator 602a and at least one second stage blowdown indicator 602b to permit an operator to monitor and/or control the different operational states of the blowdown valves 590 and 594. Similar to other operative devices of the present invention, red indicators 602a and 602b indicate the blowdown valves 590 and 594 are in an open state, green indicators 602a and 602b indicate the blowdown valves 590 and 594 are in a closed state, yellow indicators 602a and 602b indicate the blowdown valves 590 and 594 are in a locked out state, and magenta indicators 602a and 602b indicate the blowdown valves 590 and 594 are in a tagged out state. In one example embodiment, the blowdown indicators 602a and 602b comprise at least two indicator portions such that when one indicator portion is red and one indicator portion is green it indicates that the blowdown valves 590 and 594 are in mid-travel between the open and closed states.

As the coal is being feed into the dryer 48 by the coal handling system 100 it is fluidized, separated and dried by the blended air entering the dryer 48. While in the dryer 48, the coal is heated by water flowing through coils 604a and 604b. The heated water flowing into dryer 48 is from a closed loop hot water system 608 that heats the fluidized coal bed 540. Referring to FIG. 9, in one example embodiment, control system 60 controls heated water system 608 independently of hot air system 500 despite the fact that they may be heated by a similar pre-heater downstream.

Control of Heated Water Entering Dryer

Referring back to FIGS. 8a and 8b, in one example embodiment, the closed loop hot water system 608 includes at least 3 heated water regulating components. The components includes hot air coil 526 (often termed a heat exchanger) and coils 604a and 604b in the bed 540 of dryer 48, a first circulating water pump 610a and, in some embodiments, a second circulating water pump 610b in fluid communication with heat hot air coil 526.

The circulating water pumps 610a and/or 610b are used to mix hot water and cooler water returning from a first stage 49a of dryer 48 and/or a second stage 49b of dryer 48. The system is able to re-circulate and reuse the heat remaining in the water exiting the dryer 48. Mixing the cooler water exiting the dryer 48 with heated water or air permits the operator or plant to maximize its efficiencies it even further.

The circulating water pumps 610a and/or 610b can also control temperature of the water coils 604a and 604b in the first stage 49a and the second stage 49b of dryer 48. Two existing or installed water pumps can also be used to control the main flow of water through hot air coil 526 and dryer 48 water coils 604a and 604b.

Pumps 610a and/or 610b have permissive-to-start requirements that must be met before pumps 610a and 610b can be operated. In one example embodiment, the permissive-to-start requirements include a cleared emergency stop and a water system pressure at coils 604a and/or 604b above 100 psig. Pumps 610a and/or 610b can also have one or more permissive-to-stop requirements including a hot air coil 526 temperature no greater than 200 degrees Fahrenheit, a water temperature no greater than 200 degrees Fahrenheit, an air temperature flowing into air heater 526 not less than 150 degrees Fahrenheit, and a hot PA shutoff gate 530 in a closed state. Permissive-to-start and permissive-to-stop requirements can be added and/or removed depending upon the particulate material being dried and the dryer utilized.

Referring to FIGS. 3 and 5, circulating water pump icons 612a and 612b are available to permit an operator to control a flow of approximately 100 gallons per minute of hot water through hot coil 604a and/or 604b of dryer 48. The temperature of the hot water will vary from 50 to 300 degrees Fahrenheit. Although a temperature range has been provided, variations in the temperature range are considered to be within the spirit and scope of the invention. Selection of pump icons 612a and 612b by an operator permits the operator to select an auto mode for sequential stopping and starting from software 74 of control system 60.

Referring now to FIG. 5, control system 60 is in communication with at least one circulating pump indicator. In the example embodiment of FIG. 5, a first circulating pump indicator 614a and a second circulating pump indicator 614b are provided to display operational status of pumps 610a and 610b to an operator. Red pump indicators 614a and/or 614b can indicate an open state, green pump indicators 614a and/or 614b can indicate a closed state, yellow pump indicators 614a and/or 614b can indicate a locked out state, magenta pump indicators 614a and/or 614b can indicate a tagged out state, white pump indicators 614a and/or 614b can indicate a tripped or shut down state, and grey pump indicators 614a and/or 614b can indicate a loss of power to pumps 610s and/or 610b. Other colors and pattern schemes are also envisioned within the spirit and scope of the invention.

In one example embodiment, selecting pump indicator 614a and/or 614b will bring up another window that will permit an operator to select between start, stop and lockout states for pumps 610a and 610b. Other operational states such as pause and resume may also be offered for selection by an operator.

Referring to FIGS. 5 and 8, control system 60 is in communication with at least one valve 616 (see FIG. 8) that is in fluid communication with circulating water pumps 610a and 610b. The valve 616 is also in fluid communication with a cold water return 618 from dryer 48. Valve 616 is positionable between an open state and a closed state. As illustrated in FIG. 5, at least one valve indicator 620 provides a color or similar indication to an operator of the status of the valve 616. In one example embodiment, a red valve indicator 620 indicates an open valve 616, a green valve indicator 620 indicates a closed valve 616, yellow valve indicator 620 indicates the valve 616 is locked out, a magenta valve indicator 620 indicates a triggered state of the valve 616, and a grey valve indicator 620 indicates a loss of power to valve 616.

Tagging-Out Devices

Figure 6:
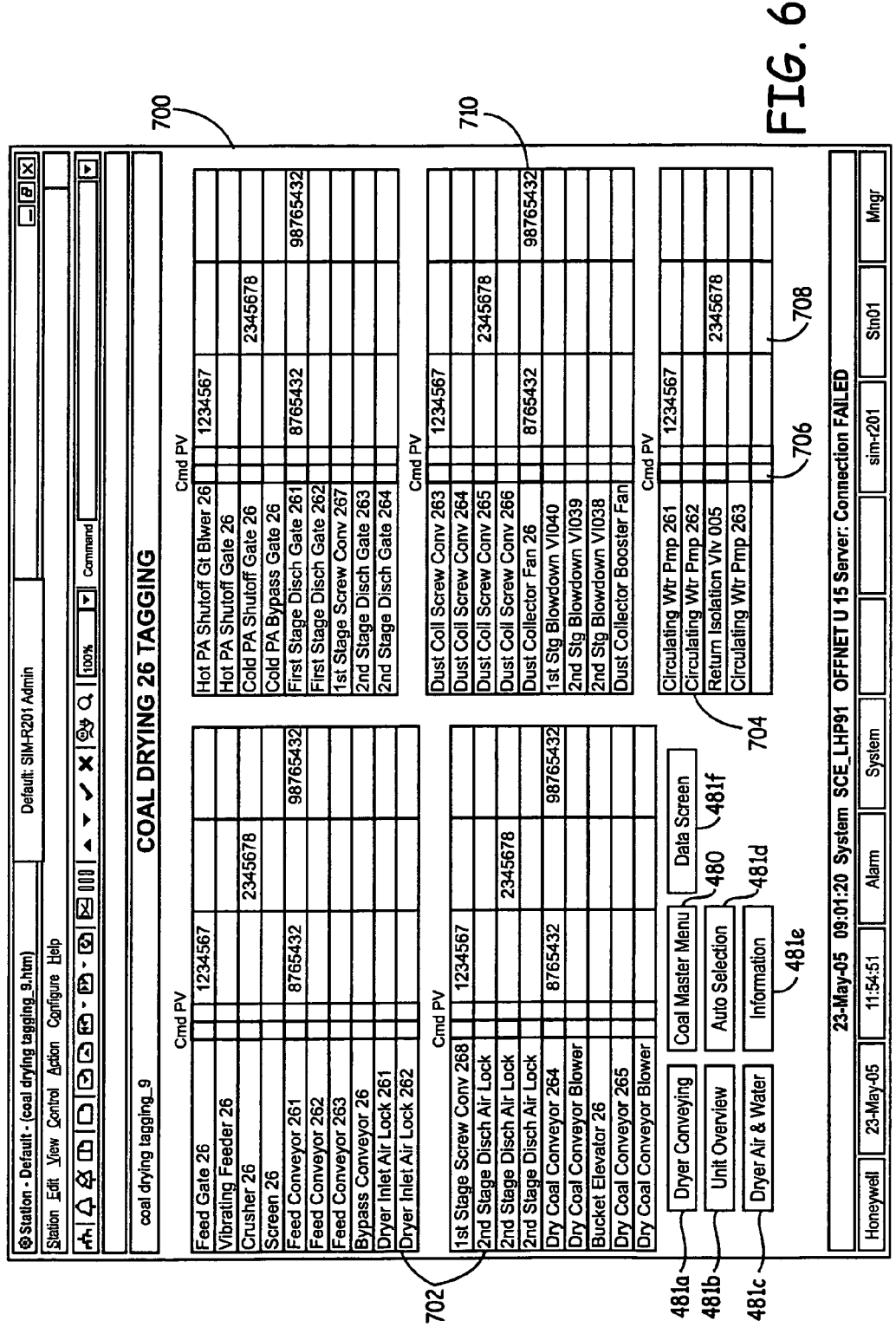
FIG. 6 is an interactive graphic user interface illustrating coal drying tagging.

Referring to FIG. 6, a tagging out GUI 700 is provided to allow an operator to easily and quickly tag out or shut down any of the above described devices controlled by control system 60. It also allows an operator to manually enter the identification number associated with each of the above devices. In its simplest form, tagging out GUI 700 includes at least one chart or graph 702 having a listing 704 all of the devices either controlled by control system 60 or devices playing a part in facilitating the drying of the raw coal. Proximate the listing 704 of devices can be at least one identifier 706 that shows the current operational status of each device. The identifier 706 can be color coded as often described above, or it can be numbers, patterns, and the like.

Proximate the at least one identifiers 706 is at least one fillable box 708 that an operator can select, click or the like to fill in the identification number 710 of a tagged out device. In one embodiment, when an operator selects fillable box 708 another window or screen appears that will accept the identification number 710 of a device. Once a device is tagged out control system 60 prevents manual overrides of the device. Once repairs or cleaning are completed an operator can select the fillable box 708 having the repaired or cleaned device, highlight the identification number 710 and erase it. By erasing the identification number 710 it automatically un-tags the device allowing control system 60 or an operator or technician to place the device back in service.

Energy Control

By using the control system 60, the operator is able to control the overall energy entering the dryer 48. Several methods of controlling the energy entering dryer 48 is possible. In one example embodiment, control system 60 raises or lowers the temperature set point of the fluidizing air leaving the mixing body 528 and entering the dryer 48.

Energy Control Method 1

The first calculation (E1) determines the amount of energy available to evaporate water by summation of sensible heat loss of the air and sensible heat loss of water:

$E1$=Hot Air flow rate×delta temperature of hot air× specific heat of air+cold air flow rate×delta temperature of cold air×specific heat of air+water flow rate×delta temperature of water×specific heat of water.

$E1$=((flow rate at the first stage 49$a$ of the dryer 48+flow rate at the second stage 49$b$ of the dryer 48+flow rate in duct 538$c$)×(air temperature entering dryer 48–air temperature leaving dryer 48)×(0.242))+((flow rate in first scrubber box 590+flow rate in second scrubber box 592+air flow in a vent box)×(temperature entering scrubber boxes–temperature leaving dryer 48)× 0.242))+(water flow rate between pumps 610$a$ and $b$ and dryer 48)×(water temperature leaving dryer 48–water temperature entering dryer 48)× 1.0))

Then by using a target set point for percent loss of weight from the coal or other particulate feed rate, a calculation is done to determine the energy required for the desired water removal rate (E2).

$E2$=(Target weight of water to remove from inlet coal flow rate,(e.g., 12%)×Time weighted average(1- 15 min.)of coal on feed conveyor 78$c$×energy to heat(coal and water)and evaporate 1 pound of water).

A ratio (R) comparison of energy available (E1) and energy required (e2) allows an adjustment to be made to the inlet air temperature target set point at the air flow entering the dryer 48, such that a proper water removal target can be achieved.

$R=E1/E2$

In one example embodiment of the invention, if R is less than 0.97, then control system 60 will increase the temperature of the air flowing into dryer 48. If R is greater than 1.03, then control system 60 will decrease the temperature of air flowing into dryer 48. Changes in the inlet air target set point for the air flowing into the dryer 48 can cause adjustments in the hot air damper 524, thereby requiring adjustments to dryer 48 when a change in its internal pressure occurs. To permit the necessary adjustments, control system 60 can have a time delay program to avoid excess movement in the control devices.

Energy Control Method 2

The second method of energy control (E2). This method is very similar to E1 with the exception of measuring the air flow rate with at least one flow instrument operatively disposed in the cold PA air duct feeding the mixing box 528. Control system 60 can use the mass flow rate of the cold PA air measured before the mixing box 528; the temperature of the cold PA air entering the mixing box 528; temperature of the hot PA air entering hot air coil 526; and temperature of the blended air to the dryer 48 to back calculate the mass flow rate of the hot PA air.

Flow(hot air entering mixing box 528)=cold PA air entering mixing box 528×((temperature of blended air entering the dryer 48–temperature of the cold PA air of the dryer 48)/(temperature of the hot PA air of the dryer 48–temperature of blended air entering the dryer 48).

Flow(mixed)=Flow(hot air entering mixing box 528)+ temperature of the cold PA air flowing into the mixing box 528.

Using the mass rates and temperatures of the hot and cold PA air control system 60 calculates the energy input to the dryer 48. Next, the control system 60 calculates the amount of energy available to evaporate water by summation of the sensible heat loss of the air (in to out) and the sensible heat loss of the water (in to out). Using method 1, E1 is modified to:

$E1$=((flow rate(hot air entering mixing box)×(hot PA air temperature for dryer 48–air temperature leaving dryer 48)×(0.242))+((cold PA air flowing into mixing box 528)×(cold PA air temperature for dryer 48–air temperature leaving dryer 48)× 0.242))+(water flow rate between pumps 610$a$ and $b$ and dryer 48)×(water temperature entering dryer 48–water temperature leaving dryer 48)× 1.0))

$E2$=the target weight of water to remove from inlet coal flow rate×time weighted average(–15 min.) of coal flow on feed conveyor 78$c$×the energy to heat(coal and water)and evaporate 1 pound of water.

A ratio (R) comparison of energy available E1 and energy required E2 allows an adjustment to be made to the inlet air temperature target set point of the air flowing into the dryer 48 so that the proper water removal target can be achieved.

$R=E1/E2$

The control of the ratio R is similar to the control of the ratio R in method 1 described above.

Energy Control Method 3

A third method of controlling the energy entering the dryer 48 utilizes and measures the water carried in the exhaust stream and compares it to the target removal rate for water. In this embodiment, a humidity instrument is operatively disposed in ducting used to carry the exhaust gas stream from dryer 48.

The first calculation (E1) determines the actual rate of water removal by the dryer 48 based on the amount of water measured in the exhaust gas stream. Using the mass flow rate of the cold PA air entering the mixing box 528; the temperature of the cold PA air for the dryer 48; the temperature of hot PA air for the dryer 48; and the temperature of blended air entering the dryer, control system 60 is capable of back calculating the mass flow rate of the hot PA air.

Hot Air=Cold Air((delta $T$ cold to mixed)/(delta $T$ hot to mixed))

Flow(hot air)=same as calculated in Method 2 above.

Flow(mixed)=Flow(hot air)+temperature of the cold PA air entering mixing box 528.

$E1$=Hot Air+Cold Air×Specific Humidity $E1$=(Flow(hot air)+temperature cold PA air entering the mixing box 528×the specific humidity leaving the dust collector 546 and/or dust collector fan 90 on its way to the exhaust stack.

Then by use of a target set point for percent loss of weight from the foal feed rate, control system 60 is capable of calculating the target water removal rate of the dryer 48 (E):

$E2$=the target weight of water to remove from inlet coal flow rate×time weighted average(1-15 min.) of coal flow on feed conveyor 78c×the energy to heat(coal and water)and evaporate 1 pound of water.

A ratio (R) comparison of energy available E1 and energy required E2 allows an adjustment to be made to the inlet air temperature target set point of the air flowing into the dryer 48 so that the proper water removal target can be achieved.

$R=E1/E2$

The control of the ratio R is similar to the control of the ratio R in methods 1 and 2 described above.
in energy control The flow rate of the hot air is measured at the first stage 49a of the dryer 48, the second stage 49b of the dryer 48 and the sparging or dilution duct 538c.

We claim:

1. A method of controlling the reduction in moisture of a particulate material within a dryer apparatus in operative communication with at least one heated waste stream, and a source of particulate material, the method comprising operating computing apparatus to automatically perform the steps of:
    (a) substantially continuously feeding particulate material into the dryer apparatus for moisture reduction;
    (b) regulating the flow of at least one heated waste stream into the dryer apparatus for fluidizing and reducing the moisture in the particulate material wherein regulating the flow of the at least one heated waste streams into the dryer apparatus includes the steps of:
        (i) determining an amount of energy available to evaporate moisture from the particulate material by receiving at least one signal from at least one of the group consisting essentially of a thermal sensor, a flow sensor, a pressure sensor, a level sensor, a switch sensor, a position sensor, and a valve sensor;
        (ii) establishing a target set point for a percent loss of weight from a particulate feed rate to determine the energy required for a desired water removal rate; and
        (iii) analyzing a ratio of energy available and energy needed and adjusting an inlet fluid temperature target set point of the fluid entering the dryer to achieve a desired water removal rate based on the analyzed ratio; and
    (c) substantially continuously feeding moisture-reduced particulate material out of the dryer apparatus.

2. The method of claim 1, wherein the step of determining an amount of energy available to evaporate moisture comprises the steps of:
    (a) adding a flow rate of the air at a first stage of the dryer apparatus with a flow rate of the air at a second stage of the dryer and a flow rate of the air in a duct entering the dryer, multiplying it by a difference between an air temperature entering the dryer and an air temperature leaving dryer, all of which is multiplied by 0.242 to obtain a result,
    (b) multiplying the result by a sum of an air flow rate in a first scrubber box and an air flow rate in a second scrubber box and an air flow rate in a vent box, all of which is multiplied by a difference between a temperature of a fluid entering scrubber boxes and a temperature of the fluid leaving dryer, all of which is multiplied by 0.242 to obtain an amended result,
    (c) adding the amended result to a product of a water flow rate between pumps and dryer and a difference between a water temperature leaving the dryer and a water temperature entering the dryer, all of which is multiplied by 1.0.

3. The method of claim 1, wherein the step of determining an amount of energy available to evaporate moisture comprises the steps of:
    (a) determining a flow rate of air entering a mixing box, multiplying the flow rate of air entering the mixing box by a hot air temperature leaving the dryer and multiplying it by 0.242 to obtain a result,
    (b) adding the result to a product of cold air flowing into the mixing box and a difference between a cold air temperature for the dryer and an air temperature leaving the dryer, all of which is multiplied by 0.242 to obtain an amended result,
    (c) adding the amended result to a product of a water flow rate between pumps and the dryer, which is multiplied to a difference between water temperature entering the dryer and water temperature leaving the dryer.

4. The method of claim 1, wherein the step of determining an amount of energy available to evaporate moisture comprises the steps of determining a flow rate of air entering a mixing box, and multiplying a specific humidity of air leaving a dust collector by the sum of the flow rate of air entering a mixing box and a temperature of cold air entering the mixing box.

5. A method of controlling the operation of a low-temperature, open-air process for heat treating a feed, by-product, or product stream within a plant operation that produces at least two different types of waste heat, wherein such process incorporates a source of feed, by-product, or product stream, a heat treatment apparatus, a first heat exchanger operatively connected to the heat treatment apparatus, and a first waste heat source provided to the first heat exchanger for delivering heat content contained within the first waste heat source to the heat treatment apparatus, a second heat exchanger operatively connected to the heat treatment apparatus, a second waste heat source different in type from the first waste heat source provided to the second heat exchanger for delivering heat content contained within the second waste heat source to the heat treatment apparatus, such method comprising operating computing apparatus to automatically perform the steps of
- (a) regulating delivery of the feed, by-product, or product stream to the heat treatment apparatus;
- (b) regulating the delivery of the first waste heat source to the first heat exchanger;
- (c) regulating the delivery of the second waste heat source different in type from the first waste heat source to the second heat exchanger;
- (d) actively combining predetermined amounts of heat content contained within the first waste heat source and second waste heat source to deliver an aggregate heat content to or within the heat treatment apparatus;
- (e) maintaining the feed, by-product, or product stream within the heat treatment apparatus exposed to the aggregate heat content for a sufficient temperature and time duration to achieve the desired degree of moisture reduction to achieve the desired degree of heat treatment; and
- (f) delivery of the heated feed, by-product, or product stream discharged from the heat treatment apparatus to a desired destination;
- (g) wherein "waste heat source" means a gaseous or liquid stream having an elevated heat content resulting from operation of a process or piece of equipment used within an industrial plant operation different from the heat treatment apparatus, such gaseous or liquid stream being used for the secondary purpose of providing heat content to the heat treatment process.

6. The controller method of claim 5, wherein the heat treatment apparatus is a fluidized-bed dryer.

7. The controller system of claim 5, wherein the heat treatment apparatus is a fixed-bed dryer.

8. The controller method of claim 5, wherein the feed, by-product, or product stream is coal.

9. The controller method of claim 5, wherein the waste heat sources are selected from the group consisting of cooling water streams, hot condenser cooling water, hot flue or stack gas, waste process steam, and discarded heat from operating equipment.

10. The controller method of claim 5, Wherein the predetermined temperature delivered to the heat treatment apparatus by the heat source does not exceed 300° F.

11. The controller method of claim 5, wherein the predetermined temperature delivered to the heat treatment apparatus by the combined first and second waste heat sources is about 200-300° F.

12. The controller method of claim 5 further comprising regulating the delivery of at least one additional waste heat source to the heat treatment apparatus by means of an associated heat exchanger to which was provided an additional type of waste heat, wherein "waste heat source" means a gaseous or liquid stream having an elevated heat content resulting from an operation of a process or piece of equipment used within an industrial plant operation different from the heat treatment apparatus, such gaseous or liquid stream being used for the secondary purpose of providing heat content to the heat treatment process.

13. The controller method of claim 5 further comprising regulating the delivery of at least one additional heat source to the heat treatment apparatus by means of an associated heat exchanger to which was provided a principal heat source, wherein "principal heat source" means a quantity of heat produced for the principal purpose of providing heat content to the heat treatment apparatus.

14. The controller method of claim 5, wherein the low-temperature, open-air, heat treatment process is used as part of a manufacturing operation.

15. The controller method of claim 14, wherein the manufacturing operation is an electric power plant.

16. The controller method of claim 5, wherein such low-temperature, open-air, heat treatment process further comprises:
- (a) a fluidizing bed contained within the heat treatment apparatus for receiving a fluidizing stream to achieve repartition of fluidized particles and non-fluidized particles within the feed, by-product, or product stream contained within the fluidized bed;
- (b) a source of fluidizing stream operatively connected to the heat treatment apparatus;
- (c) a conveyor means for transporting the non-fluidized particles inside the fluidized bed to the exterior of the heat treatment apparatus separate from the heat-treated particulate material discharged therefrom;
- (d) means for regulating the operative connection of the fluidizing stream to the heat treatment apparatus; and
- (e) means for regulating the operation of the conveyor means.

17. The controller method of claim 16, wherein the conveyor means is a screw auger.

18. The controller method of claim 16, wherein the fluidizing stream is air.

19. The controller method of claim 16, Wherein the fluidizing stream is an inert gas.

20. The controller method of claim 16, wherein the fluidizing stream is heated by one of the waste heat sources prior to operative communication to the heat treatment apparatus.

21. The controller method of claim 16, wherein the non-fluidized particles removed by the conveying means from the heat treatment apparatus enhance the flow of the feed, by-product, or product stream through the heat treatment apparatus to the heat-treated particulate material delivery means.

22. The controller method of claim 16, wherein the non-fluidized particles removed from the fluidized dryer separately from the dried particulate material discharge stream contain an increased weight percentage of at least one contaminant contained within the wet particulate material feed relative to the weight percentage of that contaminant within the wet particulate material feed.

23. A method of controlling the operation of a low-temperature, open-air process for thermally amplifying a gaseous stream for use in association with a heat treatment apparatus contained within a manufacturing operation that produces at least one waste heat source, wherein such process incorporates a gaseous stream and at least one waste heat source, such controller method comprising operating computing apparatus to automatically perform the steps of:
- (a) regulating delivery of the gaseous stream at a first temperature;
- (b) regulating the delivery of the waste heat source to a first heat exchanger whereby heat content contained within the waste heat source is delivered via the first heat exchanger to the gaseous stream which exits the first heat exchanger at a second temperature that is higher than the first temperature;
- (c) regulating the delivery of a waste heat source to a second heat exchanger whereby heat content contained within the waste heat source is delivered via the second heat exchanger to the gaseous stream which exits the second heat exchanger at a third temperature that is higher than the second temperature;

(d) regulating delivery of the gaseous stream heated in series via the first heat exchanger and second heat exchanger to the heat treatment apparatus; and (e) wherein "waste heat source" means a gaseous or liquid stream having an elevated heat content resulting from operation of a process or piece of equipment used within an industrial plant operation different from the dryer apparatus, such gaseous or liquid stream being used for the secondary purpose of providing heat content to the particulate material moisture reduction process.

24. The controller method of claim 23, wherein the waste heat source delivered to the first heat exchanger and the second heat exchanger constitute the same waste heat source within the manufacturing operation.

25. The controller method of claim 23, wherein the waste heat sources delivered to the first heat exchanger and the second heat exchanger constitute different types of waste heat sources within the manufacturing operation.

26. The controller method of claim 23, wherein the waste heat sources are selected from the group consisting of hot condenser cooling water, hot stack gas, hot flue gas, spent process steam, and discarded heat from operating equipment.

27. The controller method of claim 23 further comprising the providing of at least one additional heat exchanger and associated source of heat, whereby the gaseous stream exits the additional heat exchanger at a temperature higher than the temperature at which it exited the previous heat exchanger.

28. The controller method of claim 23, wherein the manufacturing operation is an electrical power plant.

29. A method of controlling the operation of a coal drying system incorporated into an industrial plant operation having at least two different types of waste heat, wherein such process incorporates a source of wet coal particulate material, a fluidized bed dryer, a fluidizing air stream, an air preheater for heating the fluidizing air stream before it enters the fluidized bed dryer, a heat exchanger embedded inside the fluidized bed dryer, a first waste heat source, and a second waste heat source different in type from the first waste heat source, such controller method comprising operating computing apparatus to automatically perform the steps of:

(a) regulating delivery of the coal particles to the fluidized bed dryer;

(b) regulating delivery of the air stream to the fluidized bed dryer to fluidize the coal particles within the dryer unit;

(c) regulating the delivery of the first waste heat source to the air preheater whereby heat content contained within the first waste heat source is delivered to the air preheater;

(d) regulating the delivery of the second waste heat source different in type from the first waste heat source to the air preheater whereby heat content contained within the second waste heat source is delivered to the air preheater;

(e) maintaining the fluidizing air stream within the air preheater for a sufficient time to elevate it to a desired temperature before the fluidizing air stream is delivered to the fluidized bed dryer;

(f) regulating the delivery of at least one of the waste heat sources to the heat exchanger embedded inside the fluidized bed dryer for increasing the interior temperature of the dryer unit;

(g) maintaining the coal particles within the dryer unit exposed to a combination of the heat content contained within fluidizing air stream and provided by the embedded heat exchanger for a sufficient temperature and time duration to achieve the desired degree of moisture reduction to the coal particles;

(h) regulating delivery of the moisture-reduced coal particles discharged from the fluidized bed dryer to a moisture-reduced coal particles discharge destination; and (i) wherein "waste heat source" means a gaseous or liquid stream having an elevated heat content resulting from operation of a process or piece of equipment used within an industrial plant operation different from the dryer apparatus, such gaseous or liquid stream being used for the secondary purpose of providing heat content to the particulate material moisture reduction process.

30. The controller method of claim 29, wherein the two different types of waste heat sources constitute hot condenser cooling water and hot flue gas produced within the industrial plant operation.

31. The controller method of claim 5, wherein the active combining of the first waste heat source and the second waste heat source occurs inside a mixing box positioned outside the dryer apparatus.

32. The controller method of claim 5, wherein the active combining of the first waste heat source and the second waste heat source occurs within two heat exchangers positioned in series outside the dryer apparatus.

33. The controller method of claim 5, Wherein the active combining of the first waste heat source and the second waste heat source occurs within a common heat exchanger positioned inside the dryer apparatus.

34. The controller method of claim 33, wherein the active combining of the first waste heat source and the second waste heat source occurs inside a mixing box positioned outside the heat apparatus.

35. The controller method of claim 33, wherein the active combining of the first waste heat source and the second waste heat source occurs within two heat exchangers positioned in series outside the heat apparatus.

36. The controller method of claim 33, wherein the active combining of the first waste heat source and the second waste heat source occurs within a common heat exchanger positioned inside the heat apparatus.

* * * * *